(12) United States Patent
Tsang et al.

(10) Patent No.: US 11,959,181 B2
(45) Date of Patent: Apr. 16, 2024

(54) HYDROGEN PRODUCTION

(71) Applicant: Oxford University Innovation Limited, Oxford (GB)

(72) Inventors: Shik Chi Edman Tsang, Oxford (GB); Jiaying Mo, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 0 days.

(21) Appl. No.: 17/255,678

(22) PCT Filed: Jun. 27, 2019

(86) PCT No.: PCT/GB2019/051817
§ 371 (c)(1),
(2) Date: Dec. 23, 2020

(87) PCT Pub. No.: WO2020/002920
PCT Pub. Date: Jan. 2, 2020

(65) Prior Publication Data
US 2021/0238755 A1    Aug. 5, 2021

(30) Foreign Application Priority Data

Jun. 27, 2018   (GB) ................................. 1810534

(51) Int. Cl.
*C25B 11/037*   (2021.01)
*C25B 1/04*     (2021.01)
(Continued)

(52) U.S. Cl.
CPC .............. *C25B 11/037* (2021.01); *C25B 1/04* (2013.01); *C25B 1/55* (2021.01); *C25B 9/19* (2021.01);
(Continued)

(58) Field of Classification Search
CPC .... C25B 1/02; C25B 1/04; C25B 1/55; C25B 11/049; C25B 9/50; C25B 11/087
See application file for complete search history.

(56) References Cited

U.S. PATENT DOCUMENTS 5,041,195 A * 8/1991 Taylor .................. C25B 11/031
                                                    429/534
2014/0326611 A1   11/2014 Yan et al.
(Continued)

FOREIGN PATENT DOCUMENTS

CN     107 385 468 A    11/2017
EP     3 358 042 A1     8/2018
(Continued)

OTHER PUBLICATIONS

International Search Report & Written Opinion for WO2020/002920 (PCT/GB2019/051817), dated Oct. 15, 2019, pp. 1-13.
(Continued)

*Primary Examiner* — Brian W Cohen
(74) *Attorney, Agent, or Firm* — Thomas|Horstemeyer, LLP

(57) ABSTRACT

An electrolyser (F) for generating hydrogen from water, the electrolyser comprising an electrode (102), the electrode (120) comprising nanoparticles selected from Group 1 nanoparticles or alloys or composites or mixtures thereof.

13 Claims, 22 Drawing Sheets

(51) Int. Cl.

| | |
|---|---|
| *C25B 1/55* | (2021.01) |
| *C25B 9/19* | (2021.01) |
| *C25B 9/50* | (2021.01) |
| *C25B 11/046* | (2021.01) |
| *C25B 11/077* | (2021.01) |
| *C25B 11/081* | (2021.01) |
| *C25B 11/097* | (2021.01) |

(52) U.S. Cl.
CPC .............. *C25B 9/50* (2021.01); *C25B 11/046* (2021.01); *C25B 11/077* (2021.01); *C25B 11/081* (2021.01); *C25B 11/097* (2021.01)

(56) References Cited

U.S. PATENT DOCUMENTS

| | | | | |
|---|---|---|---|---|
| 2014/0342254 | A1* | 11/2014 | Jennings | C01B 13/0207 977/773 |
| 2015/0376803 | A1* | 12/2015 | Wang | H01M 4/9016 204/290.01 |
| 2016/0346763 | A1* | 12/2016 | Wahab | B01J 35/004 |
| 2017/0241026 | A1* | 8/2017 | Ono | C25B 1/55 |
| 2018/0216243 | A1* | 8/2018 | Kudo | C25B 9/73 |

FOREIGN PATENT DOCUMENTS

| | | |
|---|---|---|
| WO | 90/05798 A1 | 5/1990 |
| WO | 2017/176599 A1 | 10/2017 |
| WO | 2018/044720 A1 | 3/2018 |

OTHER PUBLICATIONS

UK Search Report for GB1810534.6, dated Nov. 23, 2018, pp. 1-5.
International Preliminary Report on Patentability for WO2020/002920 (PCT/GB2019/051817), dated Dec. 29, 2020, pp. 1-8.
Au nanocube directed fabrication of Au-Pd core shell nanocrystals with tetrahexahedral, concave octahedral and ocotahedral structures and their electrocatalytic activity, Lu C et al., J Am Chem Soc, 132, 41, 2010 14567-14553.
Metal-air batteries: from oxygen reduction electrochemistry to cathode catalysts, Cheng F et al, Chem. soc. Rev, 2012, 41 2172-2192 p. 2178-2179 and 2188.
Metal nanoparticles and carbon based nanostructures as advanced materials for cathode application in dye-sensitised solar cells, Calandra P et al, International Journal of Photoenergy, 2010, 1-15.
Synthesis of Pt nanoparticles with preferential (100) orientation directly on the carbon support for Direct Ethanol Fuel Cell, Antoniassi R et al, Journal of Catalysts, 362, 2016, 67-74.
Acid-treated PtSn/C and PtSnCu/C electrocatalysts for ethanol electro-oxidation, Chrisafulli R et al, International Journal of Hydrogen Energy, 2014, 39, 5671-5677.
Perez-Herranz V et al: "Modification of porous nickel electrodes with silver nanoparticles for hydrogen production", Journal of Electroanalytical Chemistry, Elsevier, Amsterdam, NL, vol. 808, Jun. 13, 2017 (Jun. 13, 2017), pp. 420-426.
Wang, Y., et al: "High sensitivity hydrogen peroxideand hydrazine sensor based on silver nanocubes rich {100} facets as an enhanced electrochemical sensing platform", Biosensors and Bioelectronics, vol. 43, Dec. 20, 2012 (Dec. 20, 2012), pp. 180-185.
Mo, J., et al: "Superior Performance of Ag over Pt for Hydrogen Evolution Reaction in Water Electrolysis under High Overpotentials", ACS Applied Energy Materials, No. 2, Jan. 30, 2019 (Jan. 30, 2019), pp. 1221-1228.
European Examination Report for Application No. 19 739 343.2, dated Nov. 16, 2022, pp. 1-4.
Ursu'a et al., "Hydrogen Production From Water Electrolysis: Current Status and Future Trends", Proceedings of the IEEE 2012, pp. 410-426.
Ni. M et al., "A review on reforming bio-ethanol for hydrogen production", Int. Journal of Hydrogen Energy 2007, pp. 3238-3247.
Goni-Urtiaga et al., "Solid acids as electrolyte materials for proton exchange membrane (PEM) electrolysis: Review", Int. Journal of Hydrogen Energy 2012, pp. 3358-3372.
Xia et al., "Facile Synthesis of Ag Nanocubes of 30 to 70 nm in Edge Length with CF3COOAg as a Precursor", Chem, A. Eur. J 2010, pp. 10234-10239.
Samal A et al., "Size Tunable Au@Ag Core-Shell Nanoparticles: Synthesis and SERS", 2013, pp. 1-11.
European Examination Report for Application No. 19 739 343.2, dated Jun. 2, 2023, pp. 1-4.

\* cited by examiner

| Adsorption Mode | Model | $E_{ads}$/eV |
|---|---|---|
| Ag (100)-H-ads1 (Atop side) | | -1.419 |
| Ag (100)-H-ads2 (Bridge side) | | -1.882 |
| Ag (100)-H-ads3 (Hallow site) | | -1.906 |
| Ag (111)-H-ads1 (Atop side) | | -1.594 |

Fig. 13

| Ag (111)-H-ads2 (Bridge side) |  | -1.975 |
|---|---|---|
| Ag (111)-H-ads3 (Triangular surface site) |  | -2.091 |
| Ag (111)-H-ads4 (Octahedral surface site) |  | -2.082 |

| Adsorption mode | Model | | $E_{ads}/eV$ |
|---|---|---|---|
| Pt (100)-H-ads1 (Atop side) |  |  | -2.735 |
| Pt (100)-H-ads2 (Bridge side 1) |  |  | -2.955 |
| Pt (100)-H-ads3 (Bridge site 2) |  |  | -2.955 |
| Pt (111)-H-ads1 (Atop side) |  |  | -2.745 |

| | | |
|---|---|---|
| Pt (111)-H-ads2 (Bridge side) |  | -2.735 |
| Pt (111)-H-ads3 (Triangular surface site) |  | -2.725 |
| Pt(111)-H-ads4 (Octahedral surface site) |  | -2.785 |

HYDROGEN PRODUCTION

CROSS-REFERENCE TO RELATED APPLICATIONS

This application is the National Stage of International Application No. PCT/GB2019/051817, filed Jun. 27, 2019, which claims priority to GB 1810534.6, filed Jun. 27, 2018, which are entirely incorporated herein by reference.

This invention relates generally to hydrogen production. More specifically, although not exclusively, this invention relates to a method for producing hydrogen using catalysts comprising nanoparticles, and apparatus for use in the same.

Energy supply is a significant and well known global problem. Energy consumption is dramatically increasing each year due to the growing population and improving living standards. As a result, existing fossil energy reserves will not be able to meet the global energy demand in the future. Moreover, the use of fossil fuels is problematic due to the emission of pollutants, which have a deleterious effect on the environment and on human health. Accordingly, it has long been an aim of many to reduce global reliance on fossil fuels, and to provide renewable and sustainable alternative fuels.

Hydrogen energy systems have been proposed as an effective renewable energy source. Hydrogen has been shown to be a clean and renewable energy carrier with a high calorific value. Therefore, hydrogen energy systems are a viable and sustainable alternative to non-renewable energy sources such as fossil fuels that additionally produce harmful waste products.

In general, there are four main industrial routes for hydrogen production: (i) steam reforming of natural gas; (ii) coal gasification; (iii) water electrolysis; and (iv) naphtha steam reforming.

Currently about 95% of commercial hydrogen in the world is produced by steam reformation of natural gas or other fossil fuels (Ni, M. et. al. *Int. J. Hydrogen Energy* 32, 3238-3247 (2007)). This is achieved in a reformer where water vapour at high temperature (~700-1100° C.) is reacted with methane to yield carbon monoxide and hydrogen in the presence of a metal-based catalyst (usually nickel). However, one major disadvantage of this process is the production of carbon monoxide, which poisons the catalyst and must be removed to generate clean hydrogen.

An alternative process for the production of hydrogen is water electrolysis using a solid proton exchange membranes (PEM) as an electrolyte. The PEM water electrolysis process is advantageous over steam reformation and/or the use of other traditional fossil fuels because it is performed at much lower temperatures and no polluting biproducts are generated.

The process can be summarised as follows:

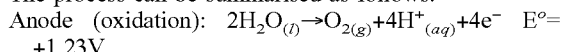
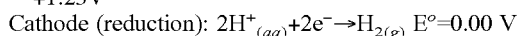
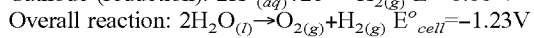

Anode (oxidation): $2H_2O_{(l)} \rightarrow O_{2(g)} + 4H^+_{(aq)} + 4e^-$ $E°=+1.23V$ Cathode (reduction): $2H^+_{(aq)} + 2e^- \rightarrow H_{2(g)}$ $E°=0.00\ V$ Overall reaction: $2H_2O_{(l)} \rightarrow O_{2(g)} + H_{2(g)}$ $E°_{cell}=-1.23V$ The water-splitting reaction occurs at the anode, which produces a large amount of $H^+$. The $H^+$ ions subsequently diffuse through the proton exchange membrane (PEM) to reach the cathode, where $H^+$ ions are recombined and reduced into $H_2$. The rate of PEM water electrolysis strongly depends on the electrode material, since the electrodes must also activate the adsorption of reactant species as well as providing an active surface for the bond cleavage and formation process. In this respect, the electrodes are known as electro catalysts.

Traditionally, the hydrogen evolution reaction (HER) at the cathode is catalysed by noble metals such as platinum, iridium, and palladium. These metals are valuable due to their utility in many other catalytic applications, but are also rare, and consequently may be expensive to purchase. The expense of the noble metal-based electrodes leading to high investment costs for PEM electrolysers is one reason why the commercial utility of PEM electrolysers has previously been limited (Proceedings of the IEEE, Vol. 100, No. 2, February 2012).

It is therefore a first non-exclusive object of the invention to provide catalysts for use in the hydrogen evolution reaction (HER) of water electrolysis that are more abundant or may be produced from abundant natural resources and may therefore be more economically viable.

Accordingly, a first aspect of the invention provides an electrode, the electrode comprising noble metal nanoparticles or mixtures of noble metal nanoparticles, the noble metal being selected from one or more of osmium, rhenium, mercury, iridium, palladium, silver, gold, copper, rhodium, ruthenium or alloys thereof.

The invention also provides an electrode, the electrode comprising noble metal nanoparticles, and preferably Group 11 nanoparticles, the nanoparticles comprising nanocube morphology and/or nanowire morphology.

The nanoparticles may comprise or consist of a morphology dominated by {100} facets, i.e. more than 50% of the total facets consist of {100} facets.

By Group 11, we mean a Group 11 element from the Periodic Table, i.e. copper (Cu), silver (Ag), or gold (Au) or alloys thereof.

By noble metals, we mean metals that are resistant to corrosion and oxidation in moist air. Examples of noble metals comprise or consist of osmium, rhenium, mercury, iridium, palladium, platinum, silver, gold, copper, rhodium, ruthenium and so on, and alloys thereof.

The nanoparticles may comprise or may consist of silver nanoparticles, copper nanoparticles, and/or gold nanoparticles or alloys thereof, e.g. nanoparticles comprising an alloy of gold and/or copper and/or silver.

In embodiments, the nanoparticles may comprise a composite of two or more metals. For example, the nanoparticles may comprise a shell of a metal and a core of a different metal. In embodiments, the nanoparticles may comprise a shell of silver and a core of gold. The shell, for example the shell of silver, may be between 0.5 to 15 nm thick, for example 0.7 to 12 nm in thickness. The core, for example the core of gold, may be between 20 to 30 nm in diameter, e.g. between 22 to 28 nm, or 24 to 26 nm.

The nanoparticles may comprise nanosphere, nanocube and/or nanowire morphology. Nanoparticles are particles with a dimension in the nanometre range (1 nm-100 nm), for example along at least one cartesian dimension (Commission for EU 2011). Clearly nanopsheres and nanocubes will typically have all three cartesian dimensions in the nanometre range. Nanowires will typically have a ratio of length (L) to width (W) such that L>>W. In some embodiments L>10 W, say L>100 W, for example L>1000 W.

Preferably, the nanoparticles comprise silver or gold or copper nanoparticles. For example, the nanoparticles may consist of silver or gold or copper nanoparticles. The silver nanoparticles may comprise or consist of one or more of silver or gold or copper nanocube morphology and/or silver or gold or copper nanowire morphology and may further comprise silver or gold or copper nanosphere morphology, or mixtures of the same (e.g. gold nanocubes and silver nanocubes, or copper nanowires and gold nanocubes).

The electrode may comprise nanoparticles, e.g. Group 11 nanoparticles, loaded onto said electrode in a liquid composition, the composition comprising between 10 wt. % to 90 wt. % nanoparticles and from 90 to 10 wt. % carbon particles. The dried composition may comprise from 10 to 50 wt. % of nanoparticles, say from 15 to 30 wt % e.g. 20 wt. % nanoparticles, the remainder or the majority of the remainder of the dried composition may comprise carbon particles.

Advantageously, the group 11 elements are more bountiful than many or most of the remaining noble metals, especially copper and silver.

In embodiments, the composition may be loaded onto a gas diffusion layer, e.g. a gas diffusion layer comprising a carbon substrate, e.g. carbon paper.

The electrode may be a cathode. The following reaction may occur at the cathode:

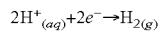

$$2H^+_{(aq)} + 2e^- \rightarrow H_{2(g)}$$

A further aspect of the invention provides an electrolyser for generating hydrogen from water, the electrolyser comprising an electrode, the electrode comprising nanoparticles, e.g. Group 11 nanoparticles, the nanoparticles comprising nanocube morphology and/or nanowire morphology.

The electrolyser may further comprise a proton exchange membrane (PEM). The PEM may be any suitable material known to the skilled person, for example, those described in Goñi-Urtiaga et. al. International Journal of Hydrogen Energy, Vol. 37, Issue 4, February 2012, 3358-3372). The PEM may comprise an acidic polymer. The PEM may comprise —$SO_3H$ functionality. The PEM may be based on chemically stabilised perfluorosulphonic acid (PFSA) and polytetrafluoroethylene (PTFE) copolymer in the acid (H+) form, e.g. Nafion® and/or a sulphonated poly-sulphone (SPSF). We prefer to use Nafion® NR211 and NR212 from FuelCellStore, Texas, USA. The PEM may comprise a backing film and/or a cover sheet. The PEM may be between 25 and 55 microns in thickness, e.g. 25.4 microns with a basis weight of 50 g/m², or 50.8 microns with a basis weight of 100 g/m².

The electrolyser may further comprise an anode, for example an anode comprising iridium dioxide ($IrO_2$).

In embodiments, the electrolyser may further comprise a hydrogen supply. The hydrogen supply may supply hydrogen carrier gas, for example, to the electrode e.g. to the cathode.

The electrolyser may further comprise a means for recirculating hydrogen gas produced in the electrolyser. The electrolyser may further comprise a means for recirculating hydrogen gas produced in the electrolyser to the electrode, e.g. the cathode.

A yet further aspect of the invention provides a method of generating hydrogen from water, the method comprising applying a voltage of 1.75V or above to an electrode comprising nanoparticles, e.g. Group 11 nanoparticles, electrolysing reactant water to generate hydrogen.

The method may further comprise applying a voltage to the electrolyser of 1.80, 1.85, 1.90, 1.95 or above, for example 2.0 V and above, for example, between 2.0 V and 3.0 V, for example, or between 2.0 V and 2.5 V. For example, the method may further comprise applying a voltage to the electrolyser of 2.1 V, 2.2 V, 2.3 V, 2.4 V, 2.5 V, 2.6 V, 2.7 V, 2.8 V, 2.9 V or 3.0V.

Another aspect of the invention provides a method of generating hydrogen from water, the method comprising applying a voltage of 0.3V or above to an electrode (e.g. a cathode) comprising nanoparticles, e.g. Group 11 nanoparticles, illuminating the electrode using visible light and electrolysing reactant water to generate hydrogen.

The method may further comprise supplying hydrogen as a carrier gas to the electrode.

The method may further comprise recirculating the hydrogen gas generated in the electrolyser for use as or as part of the carrier gas to the electrode.

The method may further comprise reducing the applied potential upon supplying hydrogen gas for use as the or as part of the carrier gas to the electrode.

The method may further comprise reducing the applied potential to between 0.5 V and 1.5 V, for example, 1.0 V, or 0.6 V, 0.7 V, 0.8 V, 0.9 V, 1.0V, 1.1 V, 1.2 V, 1.3 V, 1.4 V, or 1.5 V.

The method may further comprise contacting the electrode with an aqueous solution of acid, e.g. between 0.1M and 5M, for example between 0.5 M and 2.0 M in concentration.

A further aspect of the invention provides apparatus for generating hydrogen from water, the apparatus comprising a power supply arranged to supply a voltage of 1.75V or above, a cathode and an anode connected or connectable to the power supply, wherein the cathode comprises noble metal nanoparticles, preferably group 11 nanoparticles, or mixtures thereof.

A yet further aspect of the invention provides a method of generating hydrogen from water, the method comprising applying a voltage of 0.3V or above to an electrode (preferably a cathode) comprising nanoparticles, e.g. Group 11 nanoparticles or alloys or composites or mixtures thereof (e.g. an Ag-shell and Au-core nanoparticle composite), with reactant water, and to the electrolyser to generate hydrogen.

In embodiments, the method may comprise applying a voltage of 0.3V or above, say 0.4V or above, for example 0.5V or above, or 0.6V or above, 0.7V or above, 0.8V or above, 0.9V or above, 1.0V or above, 1.1V or above, 1.2V or above, 1.3V or above, 1.4V or above, 1.5V or above, e.g. 2.5V or above.

In embodiments, the method may comprise applying a voltage of between 0.3V to 1.2V to the electrolyser to generate hydrogen.

The method may further comprise illuminating the electrode with visible light, e.g. using a powdered light source, for example, a tungsten light source.

It has been surprisingly found that there is an enhancement in the generation of hydrogen if the electrode is illuminated using visible light, e.g. from an electrically powered source. This is particularly effective if the nanoparticles of the electrode comprise an Ag-shell and Au-core composite structure. Preferably, the voltage used in these embodiments may be between 0.3V to 1.2V.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. For the avoidance of doubt, the terms "may", "and/or", "e.g.", "for example" and any similar term as used herein should be interpreted as non-limiting such that any feature so-described need not be present. Indeed, any combination of optional features is expressly envisaged without departing from the scope of the invention, whether or not these are expressly claimed. The applicant reserves the right to change any originally filed claim or file any new claim accordingly, including the right to amend any originally filed claim to depend from and/or incorporate any feature of any other claim although not originally claimed in that manner.

Embodiments of the invention will now be described by way of example only with reference to the accompanying drawings in which.

Figure 1A:
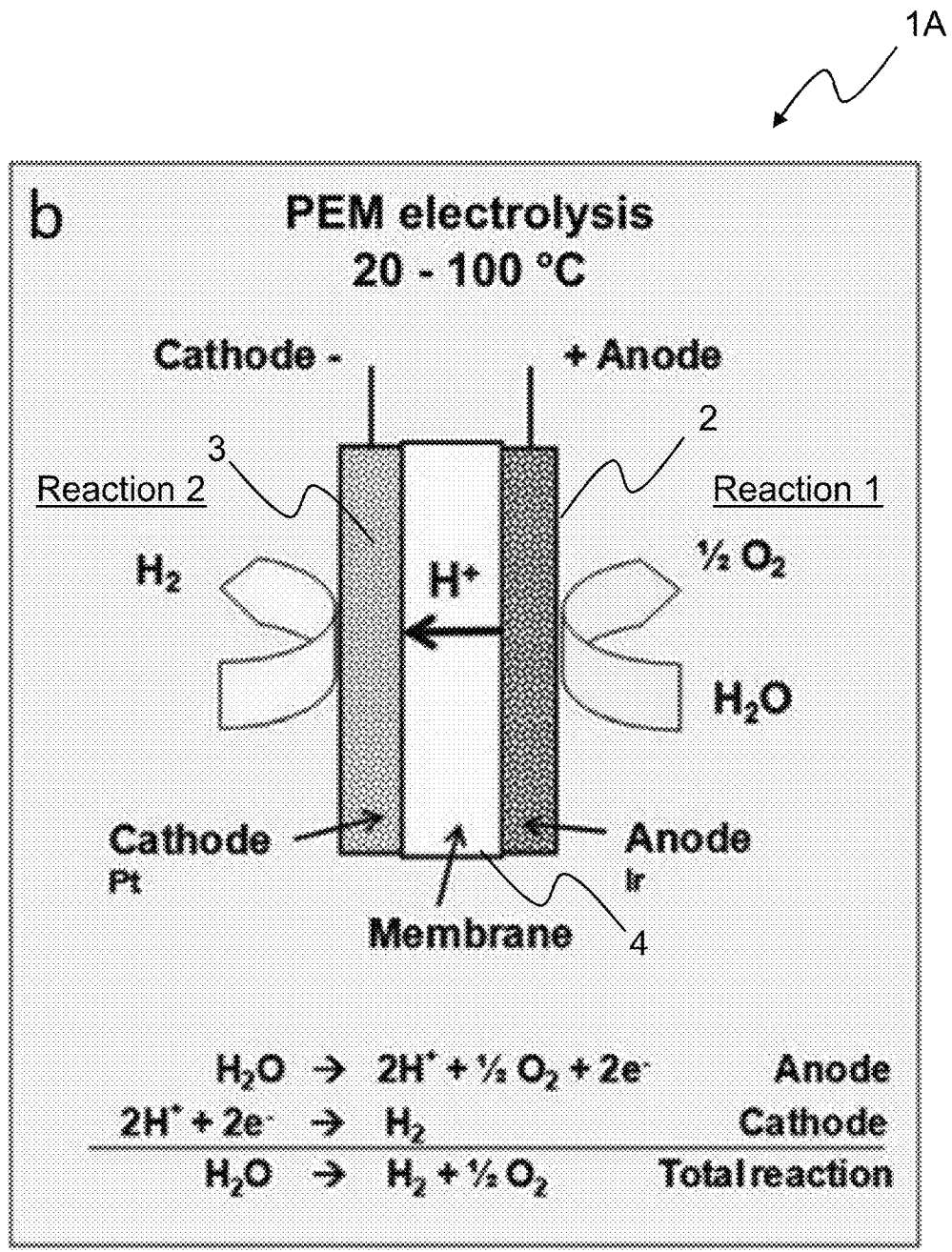
FIG. 1A is a PEM (Proton Exchange Membrane) electrolyser of the prior art.

Referring first to FIG. 1A, there is shown a PEM (Proton Exchange Membrane) electrolyser 1A of the prior art. The PEM electrolyser 1A comprises an iridium oxide ($IrO_2$) anode 2, a platinum cathode 3, e.g. a 20% Pt/C cathode, and a PEM (Proton Exchange Membrane) 4.

The PEM 4 is located adjacent to, and in-between both the iridium oxide anode 2 and the platinum cathode 3. The PEM 3 has a thickness of ~20 to 300 μm.

The electrolysis process carried out in the PEM electrolyser 1A consists of two steps:
Reaction 1: an oxygen evolution reaction (OER); and
Reaction 2: a hydrogen evolution reaction (HER).

In Reaction 1, the water is oxidised at the iridium oxide anode 2 to produce protons ($H^+$) and oxygen ($O_2$) in an oxygen evolution reaction (OER).

$$H_2O \rightarrow 2H^+ + \tfrac{1}{2}O_2 + 2e^-$$

In Reaction 2, the protons are reduced at the platinum cathode 3 to produce hydrogen ($H_2$) in a Hydrogen Evolution Reaction (HER).

$$2H^+ + 2e^- \rightarrow H_2$$

The total reaction for PEM water electrolysis is as follows:

$$H_2O \rightarrow H_2 + \tfrac{1}{2}O_2$$

The PEM 4 acts as an electrolyte by selectively allowing only for the positively charged protons to pass therethrough and does not have any intrinsic electrical conductivity.

The PEM 4 is a solid permeable membrane fabricated from Nafion®, which has a high proton conductivity ($0.1 \pm 0.02$ $Scm^{-1}$) and low gas crossover, so it can allow a high-pressure operation.

Figure 1B:
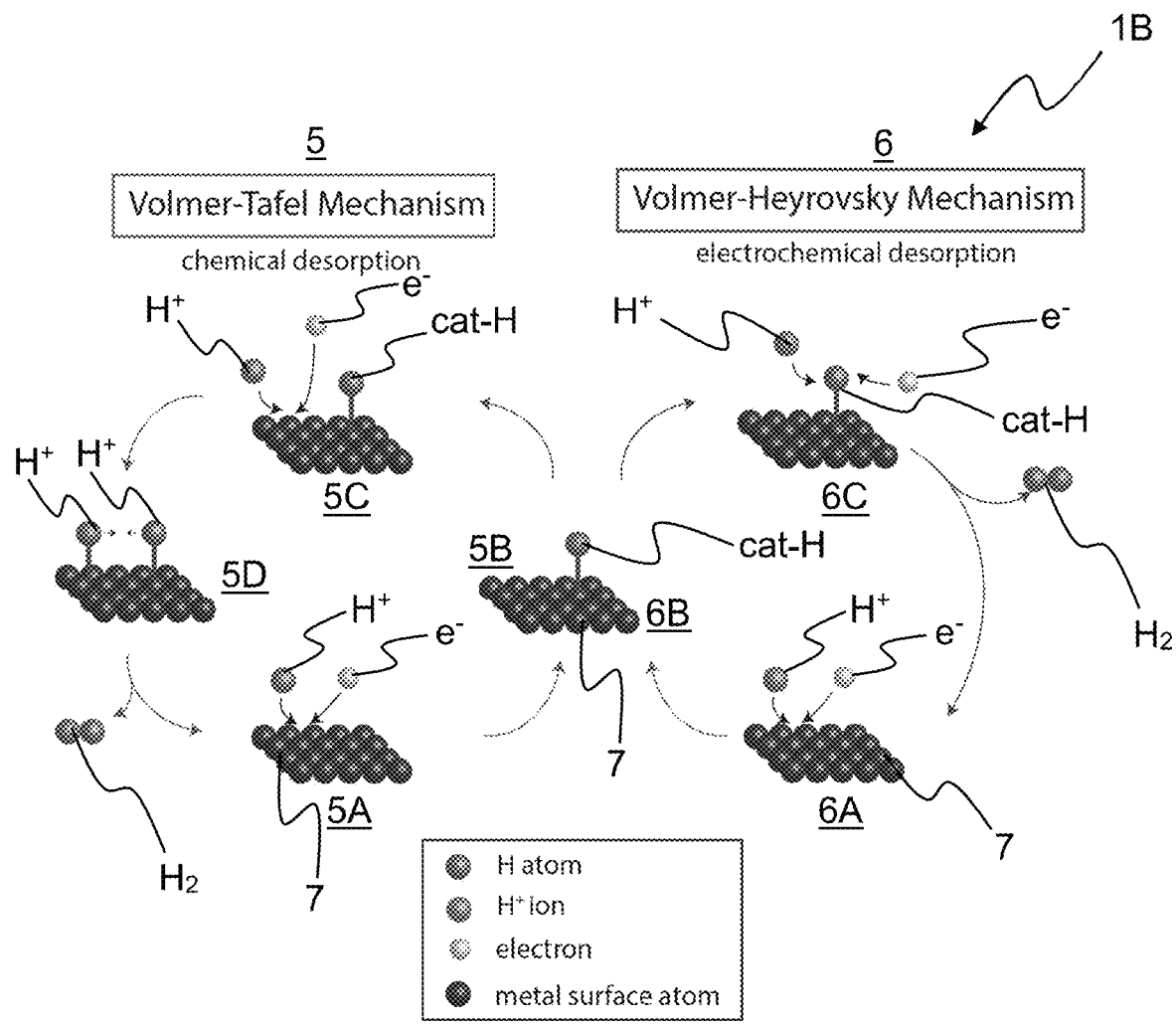
FIG. 1B is the mechanism of the hydrogen evolution reaction (HER) on the surface of a metal catalyst under acidic conditions, according to the prior art.

Referring also to FIG. 1B, there is shown the mechanisms 1B of the HER on the surface of a metal catalyst under acidic conditions, according to the prior art. The mechanisms 1B comprise two possible routes; the Volmer-Tafel mechanism 5, and the Volmer-Heyrovsky mechanism 6. There is shown a reduction catalyst 7, which in the prior art is a transition metal catalyst, for example, platinum, e.g. 20% Pt/C.

The Volmer-Tafel mechanism 5 begins with Reaction 5A (a primary discharge reaction) to produce a transition state 5B, in a Volmer reaction. In Reaction 5A, the reduction catalyst 7 abstracts a hydrogen atom (H) from a proton source ($H^+$) to produce an adsorbed H atom (cat–H), i.e. a hydrogen atom (H) adsorbed to a surface site (cat–) on the reduction catalyst 7. This process is represented in the following equation:

$$H_3O^+ + e^- + cat \rightarrow cat-H^+ H_2O \qquad \text{(Reaction 5A)}$$

The transition state 5B may undergo a further discharge reaction in Reaction 5C to produce a further adsorbed H atom (cat–H).

The adsorbed H atom (cat–H) of Reaction 5A may then combine with the further adsorbed H atom (cat–H) of Reaction 5C, to produce hydrogen $H_2$, in a Tafel reaction, as shown in Reaction 5D. This process is represented in the following equation:

$$cat-H + cat-H \rightarrow 2cat + H_2 \qquad \text{(Reaction 5D)}$$

The Volmer-Tafel mechanism 5 may then start again.

Additionally or alternatively, the HER may follow the Volmer-Heyrovsky mechanism 6. The Volmer-Heyrovsky mechanism 6 begins with Reaction 6A (a primary discharge reaction) to produce a transition state 6B, in a Volmer reaction. In Reaction 6A, the reduction catalyst 7 abstracts a hydrogen atom (H) from a proton source ($H^+$) to produce an adsorbed H atom (cat–H), i.e. a hydrogen atom (H) adsorbed to a surface site (cat–) on the reduction catalyst 7.

This process is identical to that of Reaction 5A, and is represented in the following equation:

$$H_3O^+ + e^- + cat \rightarrow cat-H + H_2O \quad \text{(Reaction 6A)}$$

In contrast to the Volmer-Tafel mechanism 5, the Volmer-Heyrovsky mechanism 6 then proceeds by the transition state 6B undergoing Reaction 6C, wherein the adsorbed H atom (cat–H) abstracts an H atom from a proton source in a single electron transfer process, known as a Heyrovsky reaction. This process is represented in the following equation:

$$H_3O^+ + e^- + cat-H \rightarrow cat + H_2 + H_2O \quad \text{(Reaction 6C)}$$

The Volmer-Heyrovsky mechanism 6 may then begin again.

The reduction catalyst 7, i.e. the cathode, is formed from a transition metal such as platinum (Pt), iridium (Ir), or palladium (Pd) in the prior art. However, these may be expensive and not economical to use for scaled-up and/or commercial processes.

It has been surprisingly found by the inventors of the present invention that the reduction catalysts of the cathode of the prior art may be replaced with a cathode comprising metal or metallic nanoparticles, e.g. Group 11 transition metal nanoparticles, specifically copper, silver, or gold nanoparticles. We prefer to use silver nanoparticles.

This enables hydrogen formed in a HER process to be produced in a more economical way. More surprisingly, the inventors have found that the morphology of the nanoparticles, e.g. silver nanoparticles, affects the catalytic activity during the HER. The inventors have found that the catalytic activity may be altered by controlling the morphology of the nanoparticles. Specifically, that silver nanocubes, nanowires, and nanospheres have different effects on the catalytic activity during the HER.

The inventors have also found that the catalytic activity for nanoparticles of the specified chemistry may be improved vis-à-vis prior art catalysts at high potential differences.

To further exemplify the invention, reference is also made to the following non-limiting Examples.

Synthesis of Silver Nanoparticles with Different Morphologies for Use as Reduction Catalysts Silver nanoparticles consisting of: (i) silver nanocubes (Procedure 1); (ii) silver nanowires (Procedure 2); and (iii) silver nanospheres (Procedure 3) were synthesised.

Reagents used were ethylene glycol (anhydrous, ≥99.8%, Sigma Aldrich), polyvinylpyrrolidone (PVP, average Mw~55,000, Sigma Aldrich), ≥sodium hydrosulfide hydrate (NaSH, Sigma Aldrich), silver trifluoroacetate (CF$_3$COOAg, 99.99%, Sigma Aldrich), glycerol (≥99.5%, Sigma Aldrich), silver nitrate (AgNO$_3$, ≥99.9999%, Sigma Aldrich), tetraethylammonium chloride (≥98%, Sigma Aldrich), platinum on graphitized carbon (20 wt. % loading, Sigma Aldrich), 2-Propanol (≥99.5%, Sigma Aldrich), hydrochloric acid S.G.1.18 (~37%, Fisher Chemical), Nafion® perfluorinated resin solution (5 wt. % in mixture of lower aliphatic alcohols and water, Sigma Aldrich), Nafion® N-324 membrane (0.15 mm (0.006 in) thick, Teflon® fabric reinforced Rf[OCF$_2$CF(CF$_3$)$_2$]$_n$)OCF$_2$CF$_2$SO$_3$H, Alfa Aesar), Sigracet gas diffusion layer (type GDL 25AC, SGL Group), carbon cloth CC4 plain (CC4P10, Fuel Cell Earth). Gas cylinders were purchased from BOC:N$_2$ (compressed nitrogen), 5% H$_2$/Ar (5% hydrogen in argon), 2.5% O$_2$/He (2.5% oxygen in helium).

Procedure 1: Synthesis of Silver Nanocubes

The silver nanocubes were synthesised using the procedure found in Xia et al. *Chem. A Eur. J.* 16, 10234-10239 (2010). Ethylene glycol (EG) (5 mL) was added into a 25 mL round bottom flask and heated under magnetic stirring in an oil bath pre-set to 150° C. NaSH (0.06 mL; 3 mM in EG) was quickly injected into the heated solution after its temperature reached 150° C. Two minutes later, HCl solution (0.5 mL; 3 mM in EG) was injected into the reaction solution, followed by the addition of poly(vinylpyrrolidone) (PVP, 1.25 mL, 20 mg/mL in EG). After another two minutes, CF$_3$COOAg (0.4 mL, 282 mM in EG) was added into reaction solution. During the whole process, the flask was placed in the oil bath at 150° C. and capped with a glass stopper except when adding the reagents. After 40 minutes, the reaction solution was quenched by placing the flask in an ice-water bath. The samples were collected by centrifugation and then washed with acetone once to remove the remaining precursors and EG, and with deionised (DI) water four times to remove excess PVP. The resulting silver nanocubes were preserved statically in DI water.

Procedure 2: Synthesis of Silver Nanowires

Glycerol (100 mL) was added into a 250 mL round bottom flask and heated under magnetic stirring in an oil bath preset to 150° C. Poly(vinylpyrrolidone) (PVP, 1.7 g) and tetraethylammonium chloride (TEAC, 25 mg) were added into the reaction solution. After all the PVP and TEAC were dissolved in the glycerol, AgNO$_3$ (0.578 g) was added into the above solution and the temperature of reaction solution was maintained at 150° C. During the whole process, the flask was placed in the oil bath at 150° C. and capped with a glass stopper except when adding the reagents. After 40 minutes, the reaction solution was quenched by placing the flask in an ice-water bath. The reaction solution was added to DI water and acetone mixture (4:1) to remove the remaining precursor AgNO$_3$ and then collected by centrifugation. After that, the solution was washed with DI water four times to remove excess PVP. The silver nanowires were preserved statically in DI water.

Procedure 3: Synthesis of Silver Nanospheres

Silver nanospheres were synthesised in a procedure similar to that of Procedure 1, with the exception that the capping agents (NaSH and HCl solutions) were not required in the synthesis of the silver nanospheres.

Ethylene glycol (EG, 5 mL) was added into a 25 mL round bottom flask and heated under magnetic stirring in an oil bath pre-set to 150° C. Poly(vinylpyrrolidone) (PVP, 1.25 mL, 20 mg/mL in EG) was injected into the reaction solution after 150° C. was reached. After two minutes, CF$_3$COOAg (0.4 mL, 282 mM in EG) was added into reaction solution. 40 minutes later, the reaction solution was quenched by placing the flask in an ice-water bath. The sample was collected by centrifugation and then washed with acetone once, and with DI water four times. The resulting silver nanospheres were preserved statically in DI water.

Structural Characterisation of the Silver Nanoparticle Catalysts

The silver nanoparticles synthesised in Procedures 1 to 3 were characterised using X-Ray powder Diffraction (XRD), transmission electron microscopy (TEM), and UV/vis spectroscopy.

Figure 2:
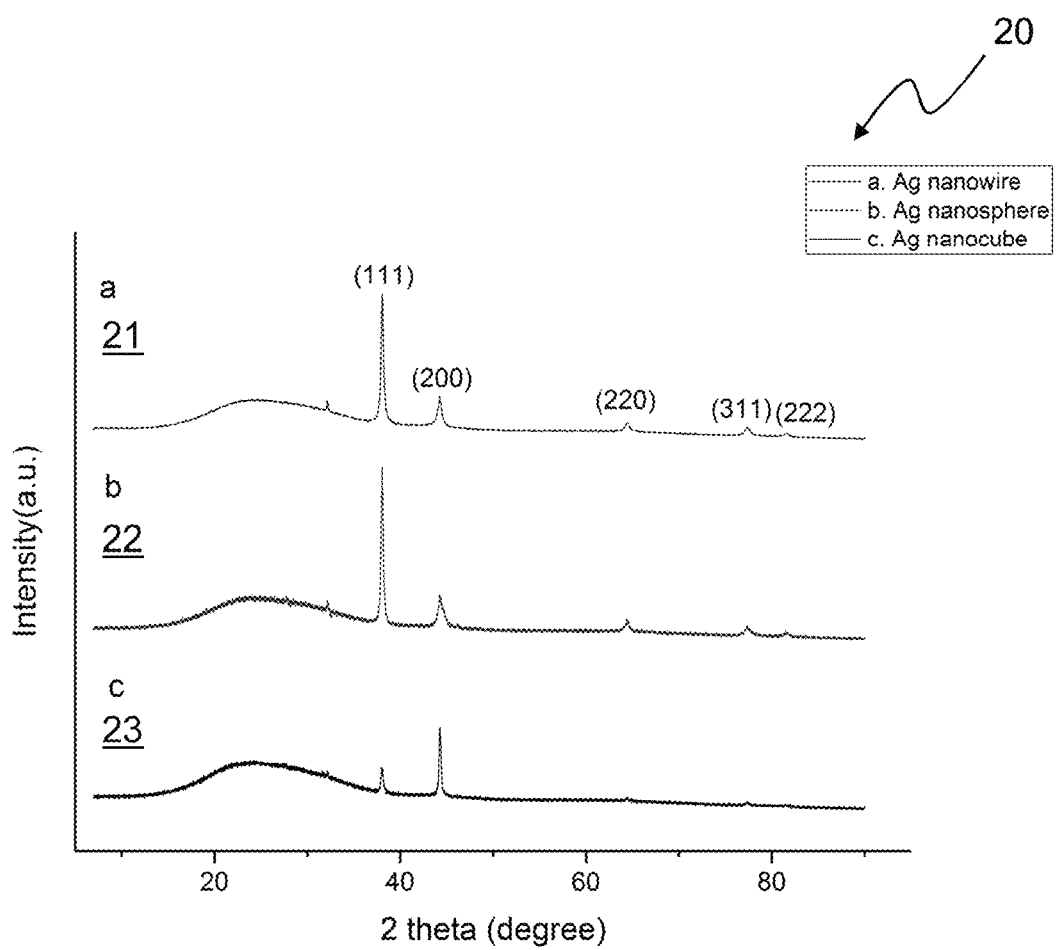
FIG. 2 is a series of XRD profiles for the silver nanoparticles synthesised in Procedures 1 to 3.

Referring now to FIG. 2, there is shown a series of XRD profiles 20 for the silver nanoparticles synthesised in Procedures 1 to 3. There is shown an XRD profile 21 for the silver nanowires of Procedure 2, an XRD profile 22 for the silver nanospheres of Procedure 3, and an XRD profile 23 for the silver nanocubes of Procedure 1.

The diffractograms were obtained and indexed using XRD, which identified the chemical structures of the silver nanoparticles synthesised in Procedures 1 to 3 to be fcc (face centered cubic) packed Ag upon phase matching with a standard plot.

The XRD analysis of silver nanoparticles on flat substrates (glass slides) confirmed that the as prepared silver nanospheres, nanowires and nanocubes, are highly crystalline silver (JCPDF database file 87-0597).

For single crystalline silver nanocubes, a significant change in the relative intensity of (111) and (200) peaks in the XRD patterns corresponds to a change in morphology. The intense (200) peak (higher ratio of (200) peak to (111) peak) can be ascribed to the texturing effect of the ordered nanocubes on the flat substrate. With the preferential orientation <200> perpendicular to the substrate, it is indicative that most cubes are aligned on the substrate with {100} facets being oriented upwardly.

Nanocubes are dominated by the {100} facets, the nanospheres are polycrystalline spherical particles which majority terminated with {111} facets, and nanowires are formed with {100} side facets and {111} facets at the ends.

Figure 3:
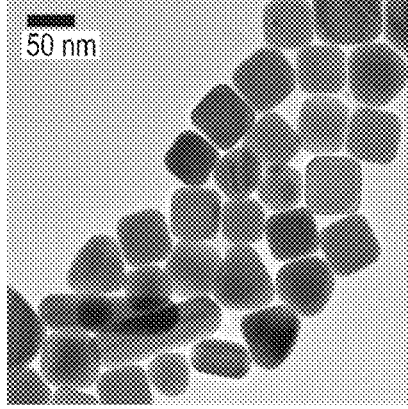
FIG. 3 is transmission electron microscopy (TEM) images and size distribution histograms for the silver nanoparticles synthesised in Procedures 1 to 3.

Referring now to FIG. 3, there is shown transmission electron microscopy (TEM) images and size distribution histograms for the silver nanoparticles synthesised in Procedures 1 to 3. TEM was used to study the morphologies of each of the Ag nanoparticle structures. The size distribution for each of the silver nanoparticle morphologies was calculated by measuring 100 particles.

There is shown a TEM image 31 for silver nanocubes, a TEM image 32 for silver nanowires, and a TEM image 33 for silver nanospheres. There is also shown a size distribution histogram 34 for silver nanocubes, a size distribution histogram 35 for silver nanowires, and a size distribution histogram 36 for silver nanospheres.

The TEM image 31 shows that the silver nanocubes have an average edge length of 45 nm. The TEM image 32 shows that the silver nanowires have an average diameter of 45 nm. The TEM image 33 shows that the polycrystalline spherical particles have an average size of 43 nm.

Figure 4A:
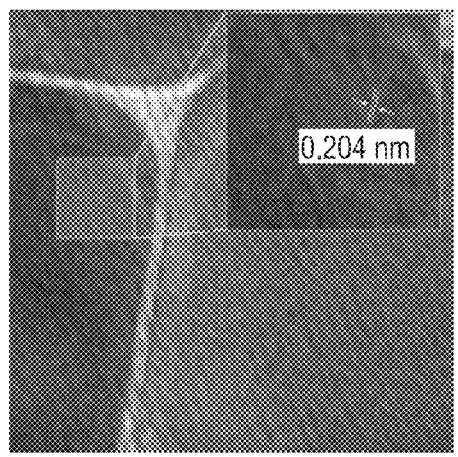
FIG. 4A is a high-resolution TEM (HRTEM) image of the silver nanocubes synthesised according to Procedure 1.

Referring now to FIG. 4A, there is shown a high-resolution TEM (HRTEM) image 41 of the silver nanocubes synthesised according to Procedure 1. The high-resolution TEM (HRTEM) image shows that the average d-spacing value is 2.0 Å (0.204 nm) for the silver nanocubes, which can be assigned to the d-spacing of {200} facets for the face-centred-cubic (FCC) Ag. The <200> axes indicates that the silver nanocubes surface are all bounded by {100} facets. In contrast, the conventional polycrystalline silver nanospheres are terminated with a more thermodynamically favourable Ag{111}, which indicates the exposed facets are mainly Ag{111} facet.

Figure 4B:
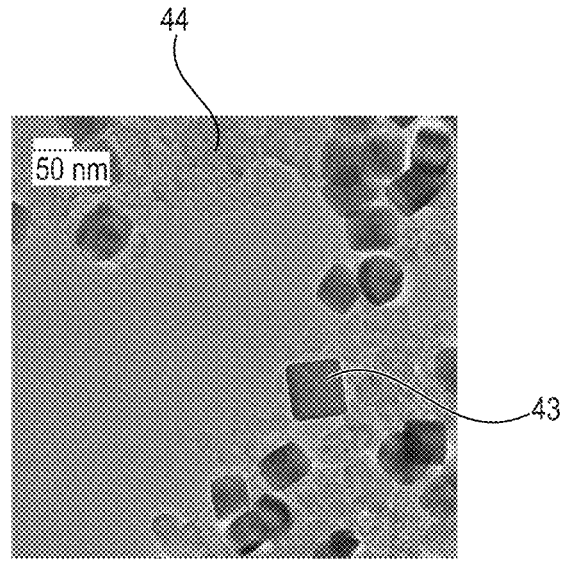
FIG. 4B is a TEM image of silver nanocubes (20% loading) on a carbon substrate.

Referring also to FIG. 4B, there is shown a TEM image 42 of silver nanocubes 43 (20% loading) on a carbon substrate 44.

Figure 5:
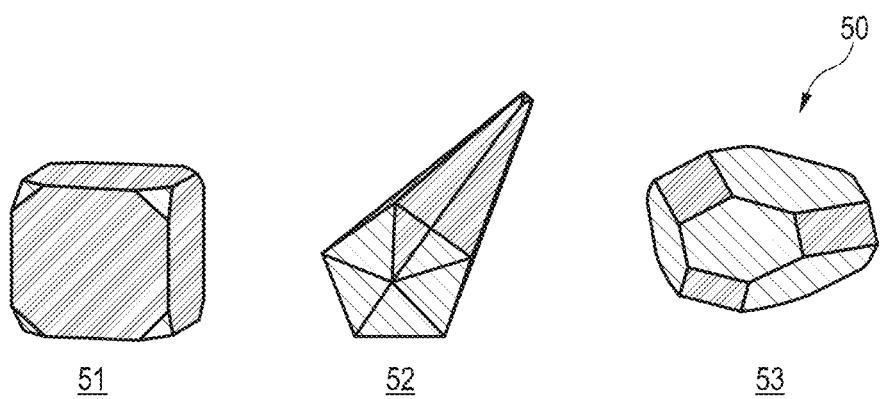
FIG. 5 is schematic illustrations of silver nanoparticles.

Referring now to FIG. 5, there is shown schematic illustrations of silver nanoparticles 50. There is shown a schematic illustration of a silver nanocube 51, a silver nanowire 52, and a silver nanosphere 53.

The shading in light grey illustrates the {111} facets, the shading in dark grey illustrates the {100} facets, and the solid lines of the illustration of the silver nanowire 52 illustrates the {111} twin planes.

The silver nanocube 51 and the sides of the silver nanowires 52 are dominated by the {100} facets and the silver nanosphere 53 is majority terminated with the {111} facets.

Silver nanowire 52 has a pentagonal cross section. These are composed of five single-crystalline domains separated by {111} twin planes and each nanowire has five equivalent flat side surfaces. Without wishing to be bound by any theory, it is believed that in the formation of silver nanowires, the crystal grew from a decahedral seed present in the early stage of the reaction described in Procedure 3. It is believed that the actual morphology of the seed may be obtained by elongating the classic decahedron shape in the <110> directions and replacing the edges at the twin boundaries with re-entrant surfaces composed of {111} facets. This modification both lowers the energy of the decahedron and produces {100} planes on its sides. The silver nanowires are then formed with {100} side facets and {111} end facets.

Figure 6:
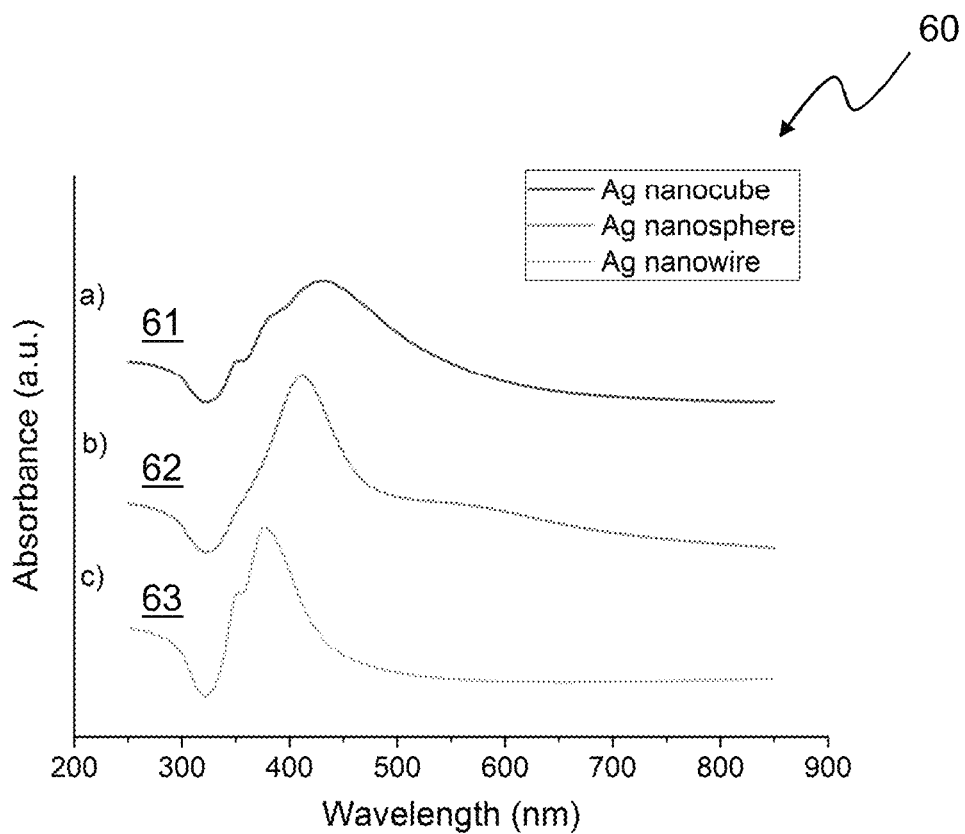
FIG. 6 is a series of UV-vis absorption spectra for the silver nanoparticles synthesised in Procedures 1 to 3.

Referring now to FIG. 6, there is shown a series of UV-vis absorption spectra 60 for the silver nanoparticles synthesised in Procedures 1 to 3. There is shown a UV-vis absorption spectrum for each of silver nanocubes 61, silver nanospheres 62, and silver nanowire 63. Each of the silver nanoparticles were suspended in water to record the UV-vis absorption spectra 60.

The main peak in the spectrum for the silver nanocubes 61 (~430 nm) is significantly red-shifted relative to the spectrum for the silver nanospheres 62 (~410 nm), despite the fact that silver nanocubes are similar in size to silver nanospheres. In addition to the red-shifted resonance, a number of additional peaks (~350 nm and ~390 nm) are present in the spectrum for the silver nanocubes 61.

The major peak (~380 nm) in the spectrum for the silver nanowires 63 is significantly blue-shifted relative to the spectrum for the silver nanocubes 61 and the spectrum for the silver nanospheres 62. It is further notes that the main peak for the nanocubes has two shoulder peaks, whereas the nanowire spectrum has a single shoulder peak and the nanosphere spectrum has no shoulder peaks.

The silver nanoparticles prepared in Procedures 1 to 3 were used to fabricate cathodes for use in a PEM electrolyser.

Procedure 4: Preparation of Electrodes

Figure 7:
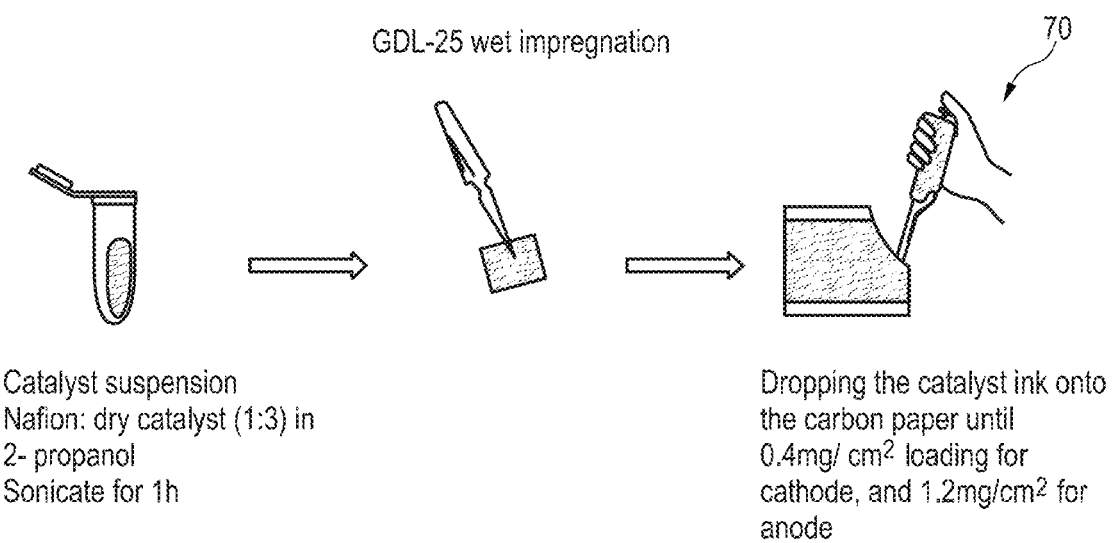
FIG. 7 is a schematic illustration of the preparation of electrodes according to Procedure 4.

Referring now to FIG. 7, there is shown a schematic illustration 70 of the preparation of electrodes by wet-impregnation of the gas-diffusion layer (GDL) (Sigracet GDL, type GDL 25AC, SGL Group).

a. Preparation of the Anode:

The gas-diffusion layer (GDL) was cut into a 15×15 mm square piece.

A catalyst suspension comprising iridium oxide ($IrO_2$, 50 mg, dispersed in 5 mL 2-propanol) was prepared.

Nafion® (5% Nafion® ionomer solution) was added to the catalyst suspension in a ratio of 1:3 (in weight) of Nafion® to dry catalyst ($IrO_2$) to form the $IrO_2$ catalyst ink.

The $IrO_2$ catalyst ink was applied onto the smooth side of the as-prepared GDL layer, followed by drying in the oven at 80° C. for 5 minutes. The loading of the catalysts onto the anode was 1.2 mg $cm^{-2}$.

b. Preparation of the Cathodes 1 to 3, According to the Invention:

The gas-diffusion layer (GDL) was cut into three 15×15 mm square pieces.

Catalyst suspensions (i) to (iii) comprising silver nanoparticles synthesised in Procedures 1 to 3 were prepared:
  (i) silver nanocubes (2 mg, dispersed in 2 mL 2-propanol);
  (ii) silver nanowires (2 mg, dispersed in 2 mL 2-propanol); and
  (iii) silver nanospheres (2 mg, dispersed in 2 mL 2-propanol).

Nafion® (5% Nafion® ionomer solution) was added to each of the catalyst suspensions in a ratio of 1:3 (in weight) of Nafion® to dry catalyst, i.e. silver nanoparticles, to form the catalyst inks (i), (ii), and (iii).

The catalyst ink (i), (ii), or (iii) was applied onto the smooth side of the as-prepared GDL layer, followed by drying in the oven at 80° C. for 5 minutes to produce the Cathode 1 (silver nanocubes), Cathode 2 (silver nanowires), and Cathode 3 (silver nanospheres). The loading of catalysts onto the cathode was 0.4 mg cm$^{-2}$.

c. Preparation of the Cathodes 4 to 6, According to the Invention:

The gas-diffusion layer (GDL) was cut into three 15×15 mm square pieces.

Catalyst suspensions (iv) to (vi) comprising silver nanoparticles synthesised in Procedures 1 to 3 were prepared:
(iv) silver nanocubes (20% in carbon, dispersed in 2 mL 2-propanol);
(v) silver nanowires (20% in carbon, dispersed in 2 mL 2-propanol); and
(vi) silver nanospheres (20% in carbon, dispersed in 2 mL 2-propanol).

Nafion® (5% Nafion® ionomer solution) was added to each of the catalyst suspensions in a ratio of 1:3 (in weight) of Nafion® to dry catalyst, i.e. silver nanoparticles, to form the catalyst inks (iv), (v), and (vi).

The catalyst ink (iv), (v), or (vi) was applied onto the smooth side of the as-prepared GDL layer, followed by drying in the oven at 80° C. for 5 minutes to produce the Cathode 4 (silver nanocubes), Cathode 5 (silver nanowires), and Cathode 6 (silver nanospheres). The loading of catalysts onto the cathode was 0.4 mg cm$^{-2}$.

d. Preparation of the Cathode CE1, According to a Comparative Example:

The gas-diffusion layer (GDL) was cut into a 15×15 mm square piece.

A catalyst ink suspension comprising 20% Pt/C (50 mg, dispersed in 5 mL 2-propanol) was prepared.

Nafion® (5% Nafion® ionomer solution) was added to the catalyst suspension in a ratio of 1:3 (in weight) of Nafion® to dry catalyst to form catalyst ink.

The catalyst ink was applied onto the smooth side of the as prepared GDL layer, followed by drying in the oven at 80° C. for 5 minutes to produce Cathode CE1. The loading of catalyst onto the cathode was 0.4 mg cm$^{-2}$.

Procedure 5—Assembly of MEA (Membrane-Electrode Assemblies)

The MEAs were prepared by hot-pressing of a Nafion® membrane, and carbon-paper based electrodes, where the metal catalysts were loaded onto via wet impregnation.

Figure 8:
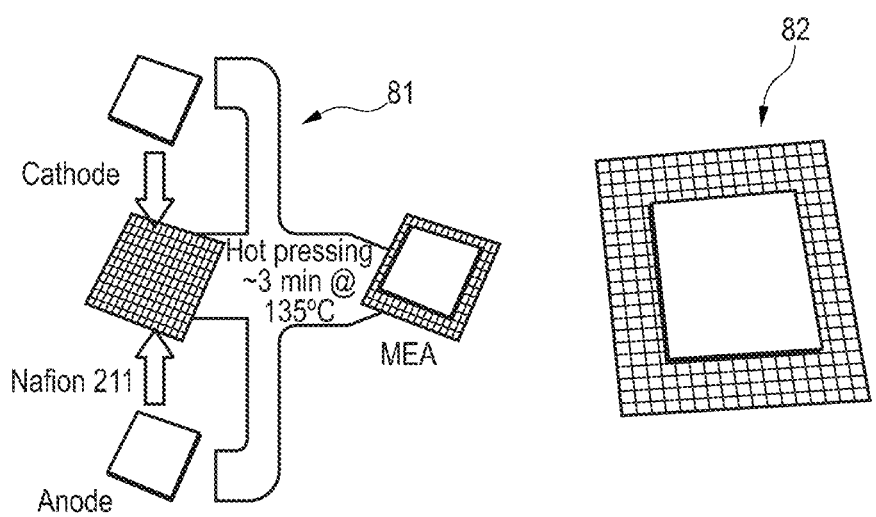
FIG. 8 is a schematic representation of an assembly of an MEA by hot-pressing, and a photograph of an as-prepared MEA cell.

Referring to FIG. 8, there is shown a schematic representation of an assembly of an MEA by hot-pressing 81, and a photograph of an as-prepared MEA cell 82.

Nafion®N-211 membrane (25 mm×25 mm square) was pre-treated by boiling it in 3% $H_2O_2$, 0.5M $H_2SO_4$ and deionized water for 1 h respectively, and then dried in the air until no water drops were present.

The Nafion® membrane was sandwiched between the two electrode pieces ($IrO_2$ anode+Cathode 1 or 2 or 3 or CE1) of Procedure 4.

The resulting structure was pressed between two Teflon® pieces in a jig. The jig was heated to 135° C. for about 3 minutes in total, and rapidly cooled in air to produce MEA 1 (containing Cathode 1), MEA 2 (containing Cathode 2), MEA 3 (containing Cathode 3), MEA 4 (containing Cathode 4), MEA 5 (containing Cathode 5), MEA 6 (containing Cathode 6) and MEA CE1 (containing Cathode CE1). The complete MEA was then ready for assembly in the electrochemical gas cell.

PEM Water Electrolysis Apparatus

Figure 9A:
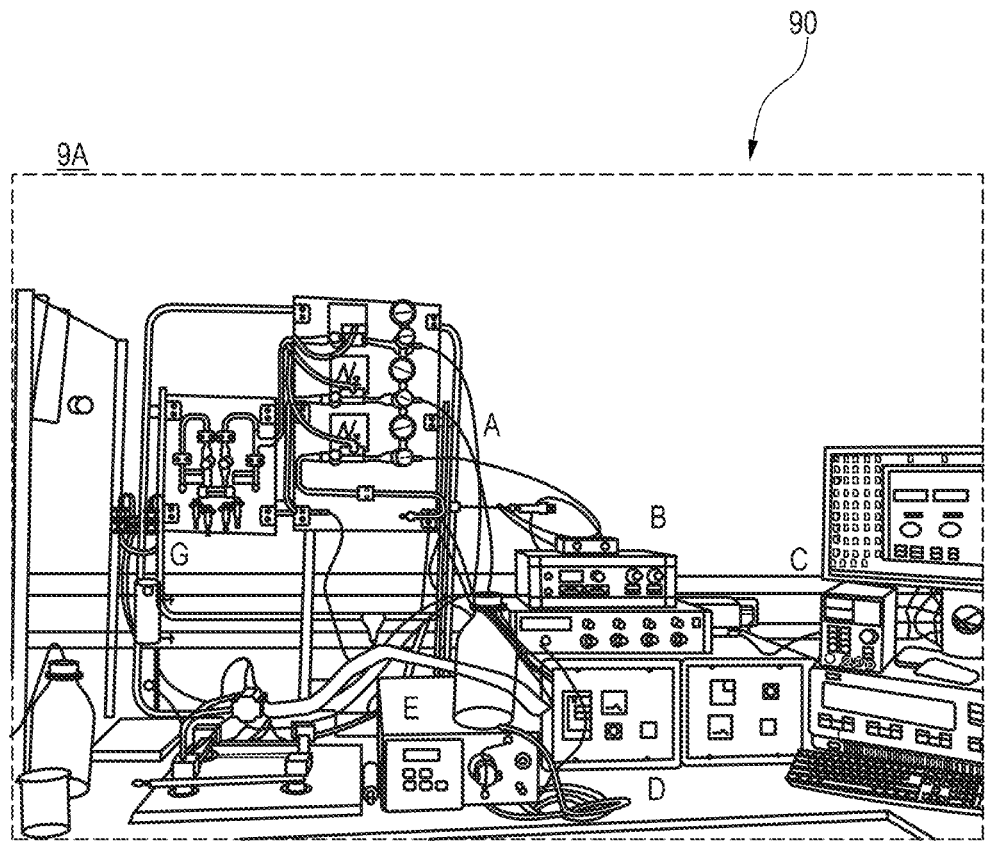
FIG. 9A is a photograph of an electrochemical reaction apparatus according to an embodiment of the invention.
Figure 9B:
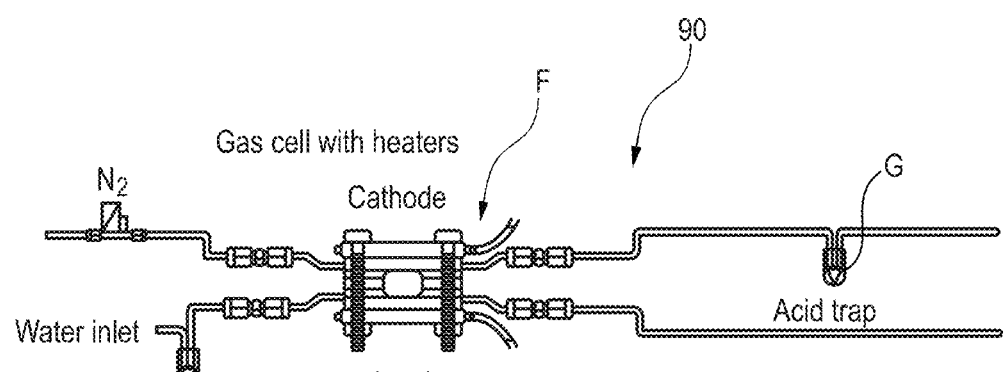
FIG. 9B is a schematic illustration of an electrochemical reaction apparatus of FIG. 9A.

Referring now to FIGS. 9A and 9B, there is shown a photograph 9A and a schematic illustration 9B of an electrochemical reaction apparatus 90 for use in producing hydrogen and measuring hydrogen evolution rates, e.g. using the MEAs 1 to 3, and MEA CE1, as prepared in Procedure 5.

There is shown a mass flow controllers (A), an automated system controller ((B), (C)), a temperature controller (D), an HPLC pump (E), a gas-phase electrochemical cell (F), and an acid trap (G).

The PEM water electrolysis reaction of the Examples of the invention took place in the gas-phase electrochemical cell (F) part of the electrochemical reaction apparatus 90.

The mass-flow controllers (A) (Brooks instrument, Model 5878) adjusted the flow of $N_2$ gas to the cell cathode side.

The applied potential was adjusted via a dedicated computer-controlled potentiostat (not shown), which was integrated in automated system controller ((B), (C)). The temperature controller (D) controlled the temperature of the gas-phase electrochemical cell (F).

The HPLC pump (E) provided the water required for the operation of the PEM membrane, and also water to act as a source of protons for the HER reaction. Only the flow of water supplied at the anode side of the gas-phase electrochemical cell (F) was humidified.

The acid trap (G) was provided to neutralise any ammonia generated in an undesired side-reaction between hydrogen and the carrier $N_2$ gas.

Figure 10A:
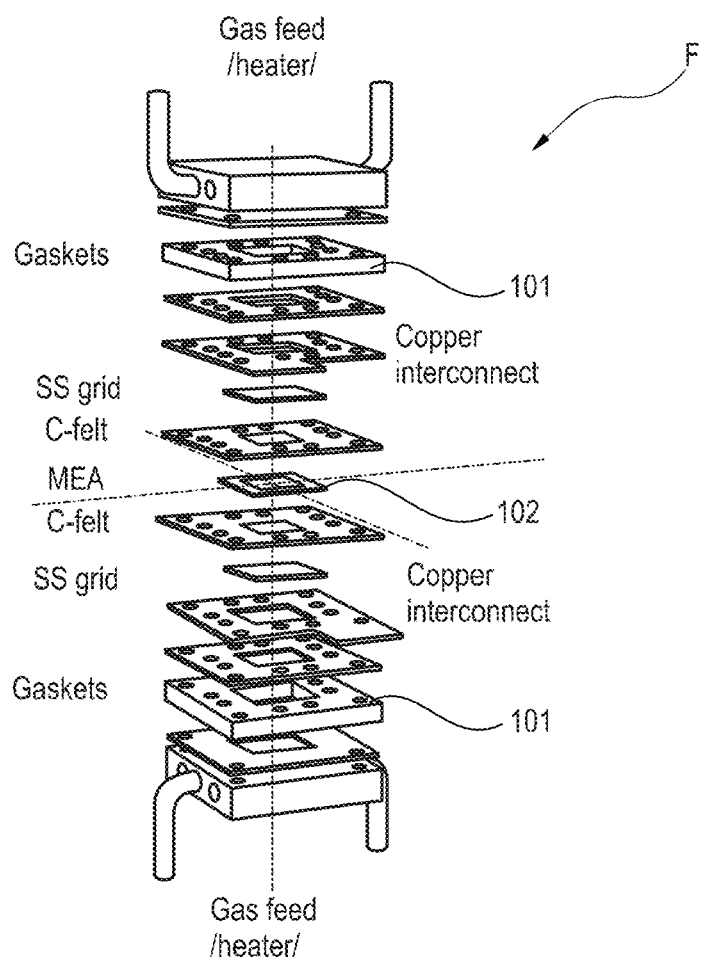
FIG. 10A is a schematic illustration of an expanded view of a gas-phase electrochemical cell of the invention.
Figure 10B:
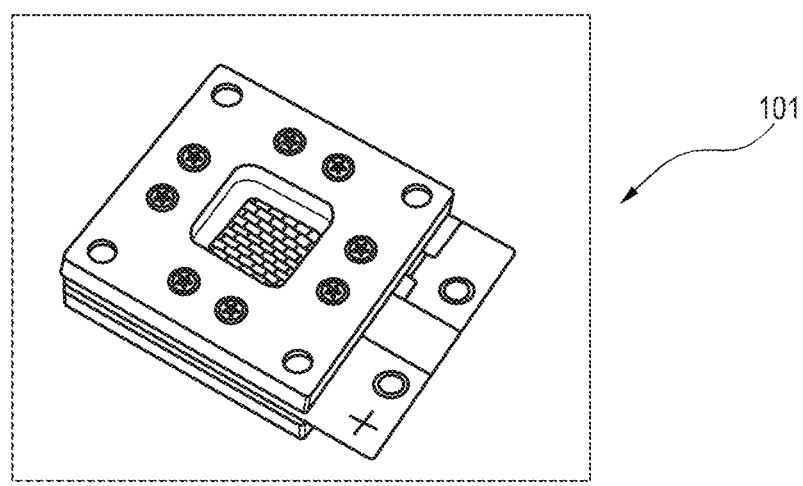
FIG. 10B is a photograph of the MEA cell holder shown in FIG. 10A.

Referring also to FIG. 10A, there is shown a schematic illustration of an expanded view of the gas-phase electrochemical cell (F). The gas-phase electrochemical cell (F) comprises a membrane-electrode assembly (MEA) cell holder 101 and an MEA 102. Referring also to FIG. 10B, there is shown a photograph of the MEA cell holder 101.

The MEA cell holder 101 was used to accommodate the test catalyst in the gas-phase electrochemical cell (F).

The gas-phase electrochemical cell (F) was equipped with four cartridge heaters and a thermocouple, which allowed for control of the operating temperatures.

For all experiments, the compressed $N_2$ at a pressure of 1 bar had a flow rate of 25 mL/min through the saturator. The water vapor would then be carried into the anode side of electrochemical cell for hydrogen generation. At the cathode side, the carrier gas was compressed $N_2$ at 25 mL/min. The side products from the cathode side would be collected by an acid trap filled with 50 mL 0.01M $H_2SO_4$ solution.

The applied potential and temperature effects were measured for the following:

A) Isothermal potential programmed reaction: For a typical isothermal potential programmed reaction, the cell temperature was immediately increased to 25° C. and held for 60 minutes to allow stabilization. The background was collected at 0.0 V for 60 minutes. The cell electrode was then subjected to a potential step of 0.5 V from 0.0 V to 2.5 V and remained at each step for 60 minutes for data collection. The solution in the acid trap was collected and analyzed after the reaction.

B) Full Sequence temperature effect reaction: For a full sequence temperature effect reaction, it was stabilized at each temperature for 30 minutes followed by 15 minutes background collection at 0.0 V. The cell electrode was then subjected to a potential step of 0.5 V from 0.0 V to 2.5 V and remained at each step for 20 minutes for data collection. The solution in the acid trap was collected and analyzed after the reaction at each temperature.

The data was processed from the automated control system as a function of current against the applied potential (0.0V-2.5V) at setting temperatures (25° C., 30° C., 35° C., 40° C., 45° C., and 50° C.). The hydrogen evolution rate for PEM water electrolysis could be calculated from the current obtained when changing the silver nanoparticle catalysts of different morphology. With the current reading on the setup, hydrogen evolution rate from PEM water electrolysis was calculated in the following way:

Time (t, unit: s)×Current reading (I, unit: A)=Charge (Q, unit: C), which is Q=I×t From Faraday constant, 1 mol=96485 C, also for per mol of $H_2$, 2 mol of electrons were required; so $$HER \text{ Rate} = \frac{Q}{\text{Faraday Constant} \times 2} = \frac{I \times t}{\text{Faraday Constant} \times 2} \text{ mol per time}$$

Examples 1 TO 3

PEM Electrolysis for Measuring HER Activity Using MEA 1 to 3

The hydrogen evolution rate (HER) of the silver nanoparticles synthesised in Procedures 1 to 3 was evaluated in the following Examples. These were compared to the performance of a commercial Pt catalyst (20 wt. % Pt on Vulcan carbon black) at different applied potentials and reaction temperatures.

Electrochemical cells in whole cell geometry were prepared using MEA 1 (cathode comprising silver nanocubes), MEA 2 (cathode comprising silver nanowires), and MEA 3 (cathode comprising silver nanospheres) of Procedure 5.

Electrolysis was carried out using MEA 1, MEA 2, MEA 3 by applying voltages from 0.2V to 2.5V in steps of 0.2V to the cell at 80° C. and recording the steady state current. The results were recorded in triplicate.

Comparative Example 1

PEM Electrolysis for Measuring HER Activity Using MEA CE1

An electrochemical cell in whole cell geometry was prepared using MEA CE1 (cathode comprising 20% Pt/C) of Procedure 5.

Electrolysis was carried out using MEA CE1 by applying voltages from 0.2V to 2.5V in steps of 0.2V to the cell at 80° C. and recording the steady state current. The results were recorded in triplicate.

Figure 11:
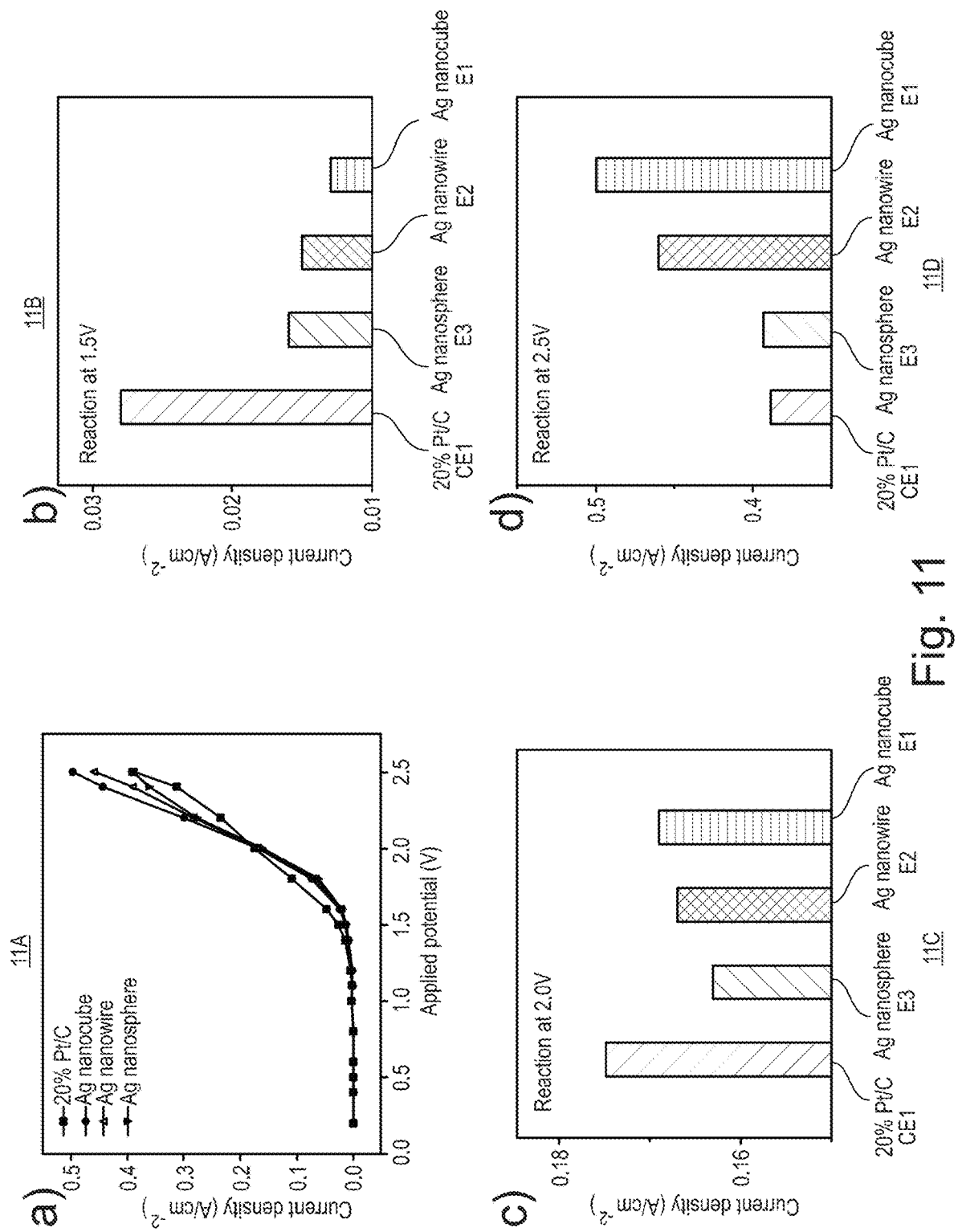
FIG. 11 is the experimental results of the use of the electrolysis cells of Examples 1 to 3, and Comparative Example 1 in the PEM electrolyser of FIGS. 9A and 9B.

Referring now to FIG. 11, there is shown the experimental results of the use of the electrolysis cells of Examples 1 to 3, and Comparative Example 1 in the PEM electrolyser of FIGS. 9A and 9B. There is shown the current-voltage curves in plot 11A of electrolysis cells of Examples 1 to 3, and Comparative Example 1. There is also shown plots (11B, 11C, 11D) for the current density (A/cm$^{-2}$) according to Examples 1 to 3 at 1.5V (plot 11B), at 2.0V (plot 11C), and at 2.5V (plot 11D).

The results shown in plot 11A are expressed in a plot of applied potential (V) against current density (mA/cm$^2$). The current density was calculated by dividing the measured current of each catalyst by the apparent surface area. It is shown that the observed current density for Comparative Example 1 (cathode comprising 20% Pt/C) is larger than for Examples 1 to 3 (comprising silver nano-cubes, wires, and spheres respectively) at low applied potentials (0.2V-2.0V). However, the current density measured using Examples 1 to 3 increases dramatically in all cases compared to Comparative Example 1 when a higher potential (2.5V) is applied.

Plot 11B shows that the current density measured according to Examples 1 to 3, and Comparative Example 1 at low potential (1.5V). The current density recorded was higher for Comparative Example 1, than any of Examples 1 to 3. It was shown that Example 3 (cathode comprising silver nanospheres) had the highest measured current density, followed by Example 2 (cathode comprising silver nanowires), and then followed by Example 1 (cathode comprising silver nanocubes).

However, in plots 11C and 11D, it is shown that this trend is reversed at 2.0V and further enhanced 2.5V. It was shown that Example 1 (cathode comprising silver nanocubes) had the highest measured current density, followed by Example 2 (cathode comprising silver nanowires), and then followed by Example 3 (cathode comprising silver nanospheres).

Interestingly, between 1.5V and 2.0V the silver particles start to demonstrate parity with the platinum electrode, clearly demonstrating the efficacy of the use of silver nanoparticles, and particularly nanowires and nanocubes.

Examples 4 TO 6

PEM Electrolysis for Measuring HER Activity using MEA 4 to 6

Electrochemical cells in whole cell geometry were prepared using MEA 4 (cathode comprising 20 wt. % silver nanocubes in carbon), MEA 5 (cathode comprising 20 wt. % silver nanowires in carbon), and MEA 6 (cathode comprising 20 wt. % silver nanospheres in carbon) of Procedure 5.

Electrolysis was carried out using MEA 4, MEA 5, MEA 6 by applying voltages from 0.2V to 2.5V in steps of 0.2V to the cell at 80° C. and recording the steady state current. The results were recorded in triplicate.

Comparative Example 2

PEM Electrolysis for Measuring HER Activity using MEA CE2

An electrochemical cell in whole cell geometry was prepared using MEA CE1 (cathode comprising 20% Pt/C) of Procedure 5.

Electrolysis was carried out by applying voltages from 0.2V to 2.5V in steps of 0.2V to the cell at 80° C. and recording the steady state current. The results were recorded in triplicate.

Figure 12:
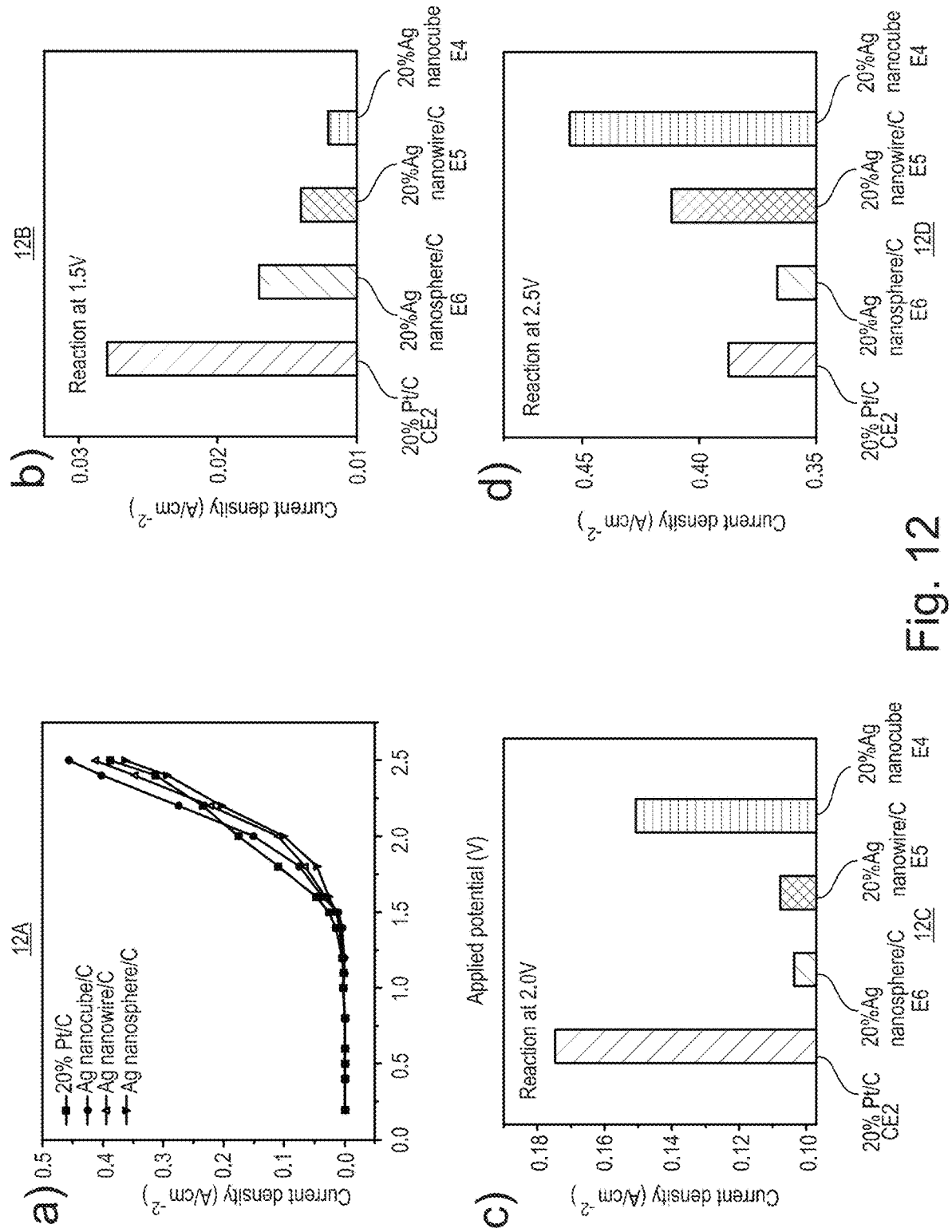
FIG. 12 is the experimental results of the use of the electrolysis cells of Examples 4 to 6, and Comparative Example 2 in the PEM electrolyser of FIGS. 9A and 9B.

Referring now to FIG. 12, there is shown the experimental results of the use of the electrolysis cells of Examples 4 to 6, and Comparative Example 2 in the PEM electrolyser of FIGS. 9A and 9B. There is shown the current-voltage curves in plot 12A of electrolysis cells of Examples 4 to 6, and Comparative Example 2. There is also shown plots (12B, 12C, 12D) for the current density (A/cm$^{-2}$) according to Examples 4 to 6 at 1.5V (plot 12B), at 2.0V (plot 12C), and at 2.5V (plot 12D).

The same trends are observed for Examples 4 to 6, and Comparative Example 2, as was observed for Examples 1 to 3, and Comparative Example 1 (shown in FIG. 11).

As will be appreciated, the current density for nanowires and nanocubes exceeds that of the platinum electrode between 2.0V and 2.5 V.

Without wishing to be bound by any theory, it is thought that the HER proceeds via a different mechanism on a platinum catalyst in comparison to a silver catalyst.

This is a surprising result. Without wishing to be bound by any theory, it is thought that the different crystal structures of the silver nanoparticles, i.e. silver nanocubes, nanowires, and nanospheres, has an effect on the current density observed in Examples 1 to 3. It is thought that this is because each of the silver nanocubes, nanowires, and nanospheres, has a different exposed surface comprising a distinct combination of facets, which causes the reaction to proceed via a different mechanism depending on the conditions.

The mechanism of the HER on the surface of a metal catalyst under acidic conditions is known to proceed via one of two possible routes to result in hydrogen evolution at the cathode; the Volmer-Tafel mechanism or the Volmer-Heyrovsky mechanism (as shown in FIG. 1B).

Discharge Reaction (Reaction 5A, FIG. 1B:

$$H_3O^+ + e^- + cat \rightarrow cat-H + H_2O \qquad \text{(Volmer Reaction)}$$

Ion+Atom Reaction (Reaction 6C, FIG. 1B):

$$H_3O^+ + e^- + cat-H \rightarrow cat + H_2 + H_2O \qquad \text{(Heyrovsky Reaction)}$$

Combination Reaction (Reaction 5D, FIG. 1B):

$$cat-H + cat-H \rightarrow 2cat + H_2 \qquad \text{(Tafel Reaction)}$$

It is thought that the rate determining step of the reaction is associated with the binding energy between the metal catalyst surface, i.e. on the cathode, and the hydrogen atoms.

Figure 13:
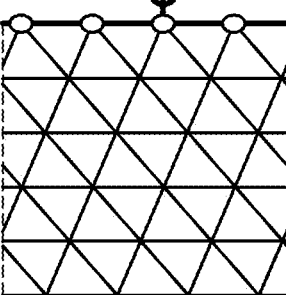
FIG. 13 is a table containing DFT data on the different modes of adsorption of hydrogen on silver surfaces.
Figure 13:
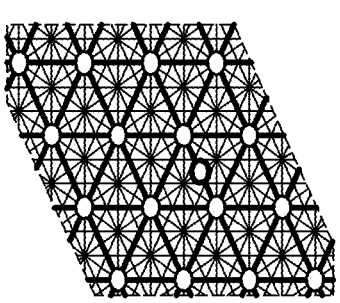
Figure 13:
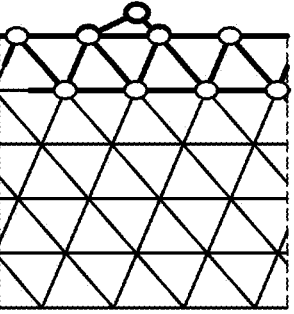

This may be studied by DFT (Density Functional Theory). Referring now to FIG. 13, there is shown a table containing DFT data on the different modes of adsorption of hydrogen on silver surfaces. The different modes of adsorption have different adsorption energies, which are generated by placing a hydrogen atom on the following sites: atop, bridge, hollow, triangular and octahedral. The table shows three Ag {100} and four Ag {111} adsorption modes of different H adsorption sites modelling and their adsorption energy in eV which is calculated by $E_{ads} = -(E_{total} - E_{substrate} - E_{gas\text{-}phase\ adsorbate})$ where $E_{total}$ is the calculated total energy of the adsorption system, $E_{substrate}$ is the energy of the clean substrate and $E_{gas\text{-}phase\ adsorbate}$ is the energy of the gas-phase molecule. The DFT model uses a 4×4 surface cell containing a six-layer Ag {100} and Ag {111} slab.

The adsorption energies of hydrogen atoms on Ag {111} and Ag {100} surfaces were calculated. A more negative (exothermic) value indicates a stronger adsorption and a more stable configuration.

The $E_{ads}$ is −2.091 eV on Ag {111} triangular surface site and −1.906 eV on Ag {100} hollow site. This indicates that H is adsorbed more strongly on close packed Ag {111} when compared to the loose-packed Ag {100} in the most favourable absorption site.

Without wishing to be bound by any theory, it is thought that at low applied potential, e.g. 1.5V, the H$^+$ flux and electrons through the membrane are of limited availability, which makes the Volmer reaction rate limiting, and gives the Ag {111} surface the highest activity. Since the rate determining step is the adsorption of proton (and electron) onto the metal catalyst surface, the stronger M-H bond of Ag {111} originating from the stronger adsorption energy gives higher hydrogen evolution rate. However, at high applied potential, e.g. 2.0V and 2.5V, the metal catalyst surfaces will be well covered with adsorbed hydrogen which eventually leads to a change of the rate determining step to the Tafel reaction. Since the Tafel pathway is associated with the H atoms recombination from M-H, the weaker M-H bond of Ag {100} allows surface migration and facilitates H$_2$ formation. This explains the fact that higher hydrogen evolution rate can be obtained for Ag {100} at higher potential.

As shown in FIG. 2 (XRD profiles of silver nanoparticles) and FIG. 3 (TEM images of silver nanoparticles), the surfaces of silver nanocubes are confirmed to comprise {100} facets, silver nanowires with {100} side facets, and {111} facets at the ends, while polycrystalline silver nanospheres are dominated by {111} facets.

It is thought that the trend in the current densities recorded at low potential (1.5V) (shown in FIG. 11), wherein Example 3 (cathode comprising silver nanospheres)>Example 2 (cathode comprising silver nanowires)>Example 1 (cathode comprising silver nanocubes), is observed because the Volmer pathway is rate determining.

In contrast, the trend in the current densities recorded at high potential (2.0V and 2.5V) (shown in FIG. 11), wherein Example 1 (cathode comprising silver nanocubes)>Example 2 (cathode comprising silver nanowires)>Example 3 (cathode comprising silver nanospheres), is observed (and the trend observed at 1.5V is reversed) because the Tafel pathway is now rate determining.

Figure 14:
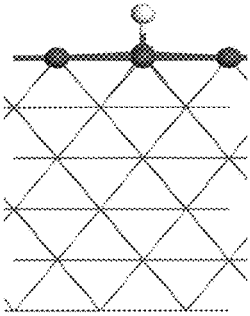
FIG. 14 is a table containing DFT data on the different modes of adsorption of hydrogen on platinum surfaces.
Figure 14:
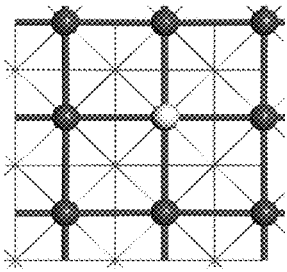
Figure 14:
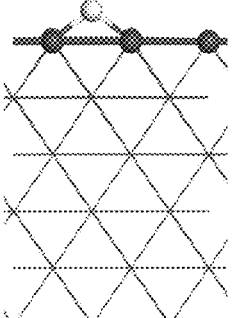
Figure 14:
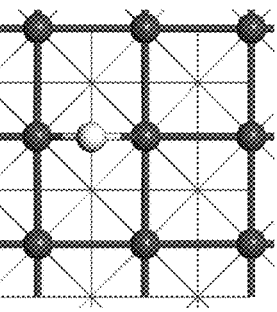
Figure 14:
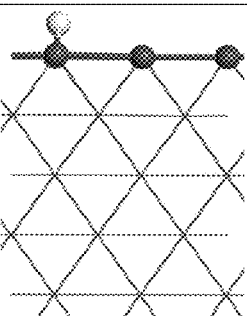
Figure 14:
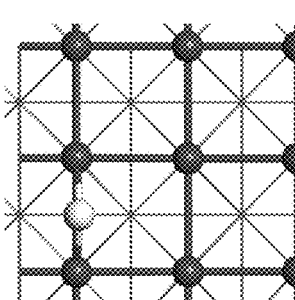
Figure 14:
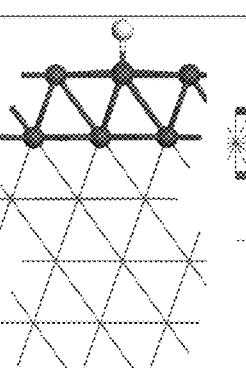
Figure 14:
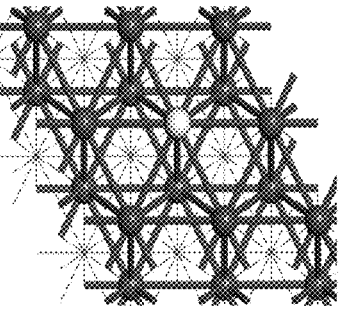
Figure 14:
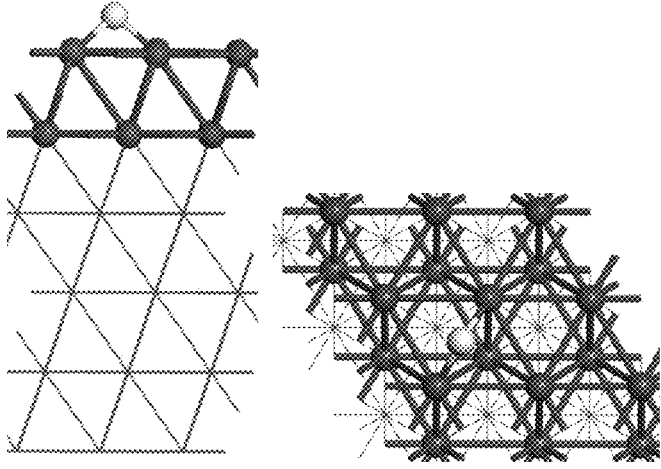
Figure 14:
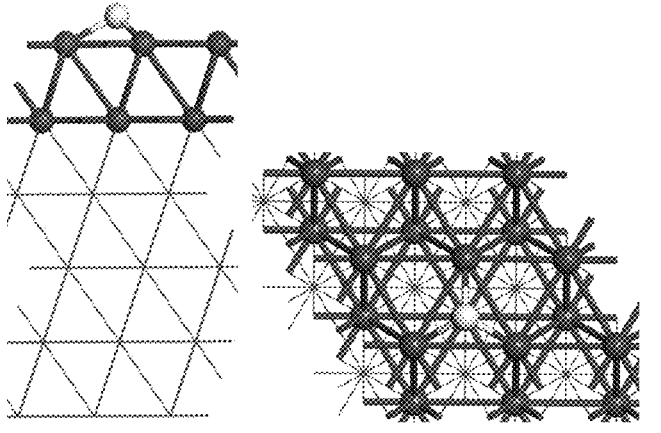
Figure 14:
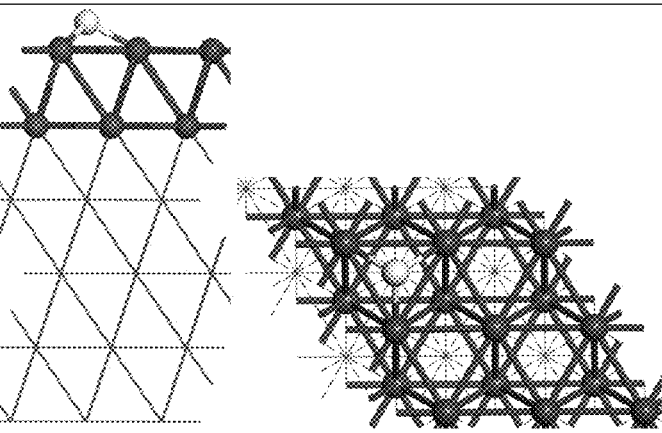

Referring now to FIG. 14, there is shown a table containing DFT data on the different modes of adsorption of hydrogen on platinum surfaces. A 4×4 surface cell model was constructed with a six-layer Pt {100} and Pt {111} slab. Three Pt {100} and four Pt {111} adsorption modes of different H adsorption sites modeling and their adsorption energy in eV which is calculated by $E_{ads} = -(E_{total} - E_{substrate} - E_{gas\text{-}phase\ adsorbate})$ where $E_{total}$ is the calculated total energy of the adsorption system, $E_{substrate}$ is the energy of the clean substrate and $E_{gas\text{-}phase\ adsorbate}$ is the energy of the gas-phase molecule.

Referring also to Table 1, there is shown a summary of the adsorption energies on surfaces Ag {100}, Ag {111}, Pt {100} and Pt {111} in different adsorption modes of different adsorption sites, according to the DFT calculations of FIG. 12 and FIG. 14. For {100} facets, Ads 1 is a top site, Ads 2 is bridge site and Ads 3 is hollow site; while for {111} facets, Ads 1 is a top site, Ads 2 is bridge site, Ads 3 is a triangular surface site and Ads 4 is a octahedral surface site.

TABLE 1

Adsorption Energies for Silver and Platinum Surfaces

| | $E_{ads1}$/eV | $E_{ads2}$/eV | $E_{ads3}$/eV | $E_{ads4}$/eV |
|---|---|---|---|---|
| Ag {100} | −1.419 | −1.882 | −1.906 | — |
| Ag {111} | −1.594 | −1.975 | −2.091 | −2.082 |
| Pt {100} | −2.735 | −2.955 | −2.955 | — |
| Pt {111} | −2.745 | −2.735 | −2.725 | −2.785 |

In Table 1, it is shown that the $E_{ads}$ is −2.955 eV on Pt {100} hollow site and −1.906 eV on Ag {100} hollow site. Similarly, the $E_{ads}$ is −2.785 eV on Pt {111} octahedral surface site and −2.091 eV on Ag {111} triangular surface site.

Without wishing or intending to be bound by any theory, it is thought that this data suggests that H is adsorbed more strongly on Pt than Ag for both {100} and {111} facets in the most favourable absorption site. As a result, the current density (or rate of H$_2$ evolution) of Pt is greater than Ag for both corresponding {100} and {111} facets.

However, at high applied potential (2.5V), water splitting on the anode becomes more effective and hence the proton flux through the membrane is increased; meanwhile, the availability of electrons at cathode also increases, which provides a high electromotive force for proton reduction. It is thought that these two effects result in the extensive coverage of adsorbed hydrogen on the metal surface. In this regard, Tafel rate limiting step is dominant. As a result, weaker Ag—H allows a larger extent of surface migration and hence higher rate for hydrogen formation as compared to Pt—H. Therefore, the current density at higher potential (2.5V) follows the trend 20% silver nanoparticles/C>20% Pt/C for silver nanocubes and silver nanowires.

Figure 15:
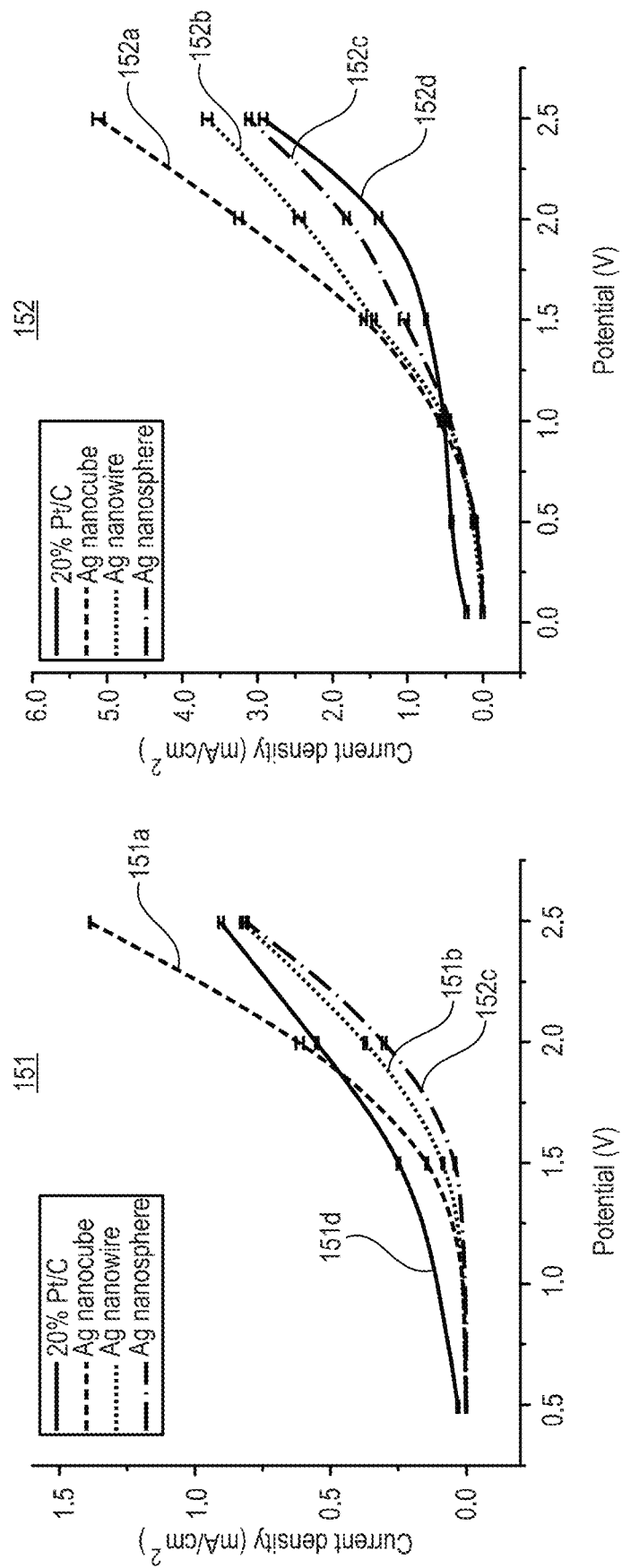
FIG. 15 is current-voltage curves of electrolysis cells of Examples 1 to 3, and Comparative Example 1 at 50° C.

Referring now to FIG. 15, there is shown the current-voltage curves of electrolysis cells of Examples 1 to 3, and Comparative Example 1 at 50° C. There is shown graph 151, which shows the current-voltage curves using $N_2$ as a carrier gas, and graph 152, which shows the current-voltage curves using $H_2$ as a carrier gas.

The graph 151 shows the current-voltage curve using $N_2$ as a carrier gas for silver nanocubes 151a, silver nanowires 151b, silver nanospheres 151c, and 20% platinum on carbon 151d. As can be seen, the silver nanocubes 151a exceed the Pt at about 1.75V.

The graph 152 shows the current-voltage curve using $H_2$ as a carrier gas for silver nanocubes 152a, silver nanowires 152b, silver nanospheres 152c, and 20% platinum on carbon 152d.

When $H_2$ is used as carrier gas, more $H^+$ can be generated from the anode side of the cell. As a result, the proton flux through the membrane will be enhanced when using $H_2$ under the equivalent applied voltage than $N_2$.

It is shown that the current density at equivalent applied potential indeed increases with the proton flux as the carrier gas is changed from nitrogen to hydrogen.

It was surprisingly found that the difference between the results of each of the silver nanoparticle morphologies, and platinum, is greater in the high potential regime. For example, at 2.5V the current density difference between silver nanocubes and platinum is 0.5 mA/cm$^2$ with lower $H^+$ flux in $N_2$. In contrast, the current density difference increases to 2.5 mA/cm$^2$ when the carrier gas is changed to $H_2$. This is five times higher than when $N_2$ is used as carrier gas. With the increasing proton availability, the Tafel reaction becomes the rate determining step at high applied potential (2.5V). The weaker Ag—H bond is more readily dissociated for $H_2$ recombination than that of the stronger Pt—H bond, yielding a higher current density.

Advantageously, it is shown that when the carrier gas is $H_2$ (see graph 152) that the current density measured for both the silver nanocubes 152a and the silver nanowires 152b is equal to that measured for 20% platinum on carbon 151d at a much lower potential, i.e. at 1.0 V, in comparison to when $N_2$ is used as the carrier gas (in graph 151), i.e. at ~1.75 V for silver nanocubes 151a only. This demonstrates that an increase in proton flux shifts the mechanism from the Volmer mechanism to the Tafel mechanism.

The use of Group 11 metals nanoparticles, e.g. silver nanocubes and/or silver nanowires, as a catalyst maintain an advantage over the use of a 20% platinum on carbon electrode because the same yield of hydrogen may be obtained but with the use of a metal catalyst, i.e. silver, that is more abundant and may be cheaper, and therefore more cost-effective, than rarer metals, e.g. platinum, to use in process for producing hydrogen.

Figure 16A:
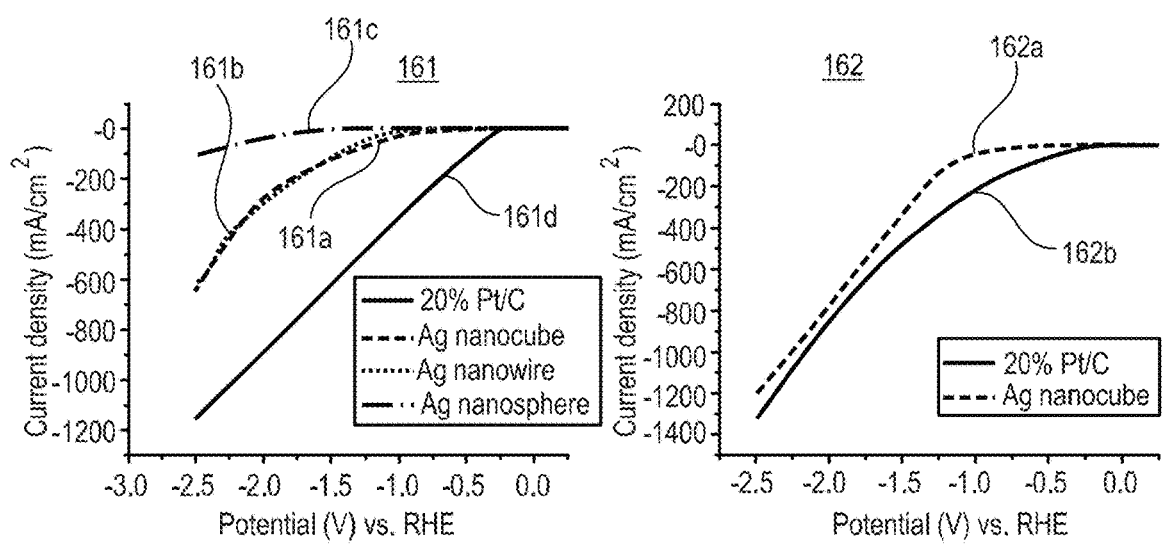
FIGS. 16A and 16B are a series of graphs for Linear Sweep Voltammetry (LSV) tests for silver nanoparticles and platinum catalysts, without the use of a PEM membrane.
Figure 16B:
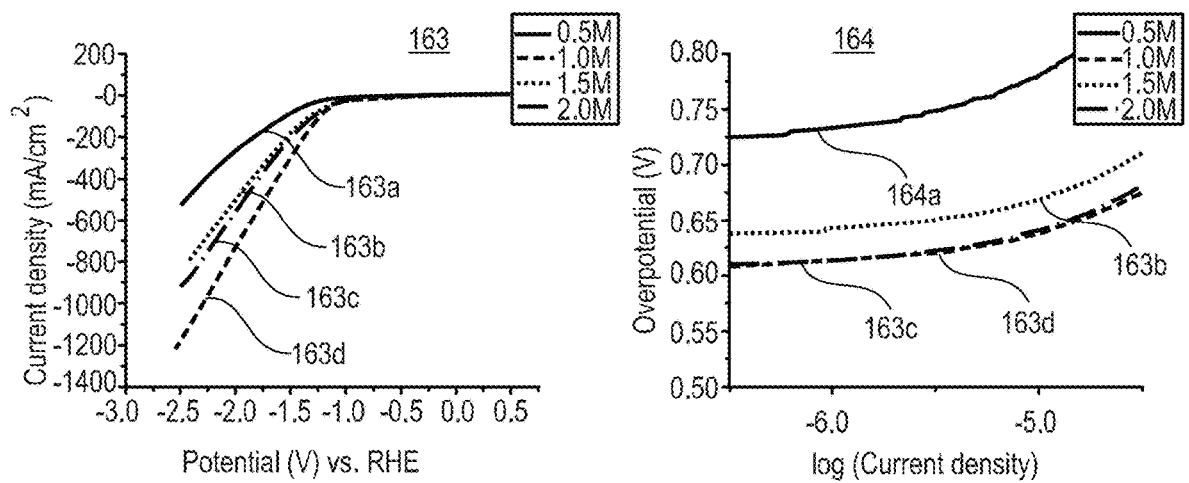

Referring now to FIG. 16A and FIG. 16B, there is shown a series of graphs for Linear Sweep Voltammetry (LSV) tests for silver nanoparticles and platinum catalysts, without the use of a PEM membrane.

Referring now to FIG. 16A, there is shown graph 161, which shows the current densities vs. potential for hydrogen evolution at thin films of: (i) silver nanocubes 161a; (ii) silver nanowires 161b; (iii) silver nanospheres 161c; and (iv) a 20% Pt/C reference 161d, in an $N_2$ purged 0.5M $H_2SO_4$ solution. There is also shown graph 162, which shows the current densities vs. potential for hydrogen evolution at thin films of: (i) silver nanocubes 162a; and (ii) a 20% Pt/C reference 162b, in $N_2$ purged 2.0M $H_2SO_4$ solution.

In the experiment to produce the data shown in graph 161, the potential was run from 0.25V to −2.5V/RHE in $N_2$ purged 0.5M $H_2SO_4$ to monitor the activity of all four catalysts. The onset potential for proton reduction observed for 20% Pt/C reference is much more positive than that of silver catalysts. At low potential (<1.5V), hydrogen evolution catalyzed by Pt occurs more readily under the low acidity condition (0.5M $H_2SO_4$). At higher potential, however, the same trend is also observed as well. This is somewhat contradictory to the activity plot measured using the PEM described in the Examples shown in FIGS. 11 and 12. The discrepancy can be ascribed to the poor proton availability for the catalyst in 0.5 M $H_2SO_4$ with an appalling proton diffusion rate (which is equivalent to ~2 mS cm$^{-1}$ flux in PEM) when compared to the fully acidified Nafion® membrane (~0.1 S cm$^{-1}$). Therefore, a stronger acidic electrolyte is needed to mimic the PEM cathodic conditions. When using the 2.0M $H_2SO_4$, it is interesting to find that the current density becomes comparable between silver nanocube and 20% Pt/C reference at 2.5V. This is due to the fact that more protons are available for HER on the morphology-controlled silver catalysts. Under higher applied voltage, the weaker Ag—H surface bonds are more favorable for recombination to sustain higher HER activity (Tafel limiting step). Thus, the same trend in current density: silver nanocubes>silver nanowires>silver nanospheres>20% Pt/C is also demonstrated in LSV if applying very high acidity electrolyte with higher proton availability. Thus, this polarization (negative potentials) study for the evaluation single catalyst can eliminate any potential artefacts introduced in anode and PEM components.

Referring now to FIG. 16B, there is shown graph 163, which shows the current densities vs. potential for hydrogen evolution at thin films of silver nanocubes in $N_2$ purged (i) 0.5M $H_2SO_4$ 163a; (ii) 1.M0 $H_2SO_4$ 163b; (iii) 1.5M $H_2SO_4$ 163c; and (iv) 2.0M $H_2SO_4$ 163d solution. There is shown graph 164 the corresponding Tafel plots in (i) 0.5M $H_2SO_4$ 164a; (ii) 1.M0 $H_2SO_4$ 164b; (iii) 1.5M $H_2SO_4$ 164c; and (iv) 2.0M $H_2SO_4$ 164d solution, which were recorded on glassy carbon electrodes.

Increasing the electrolyte acidity of LSV corresponds to the increase in proton flux: the current density increases at high applied potential. As shown in graph 164, the slopes of the Tafel plots progressively become gentler with increasing electrolyte acidity. This indicates that the proton flux must be one of the effective factors for HER with morphology-controlled catalysts. Thus, the onset potential of the same cathode catalyst will be more positive with increasing electrolyte acidity.

Figure 17:
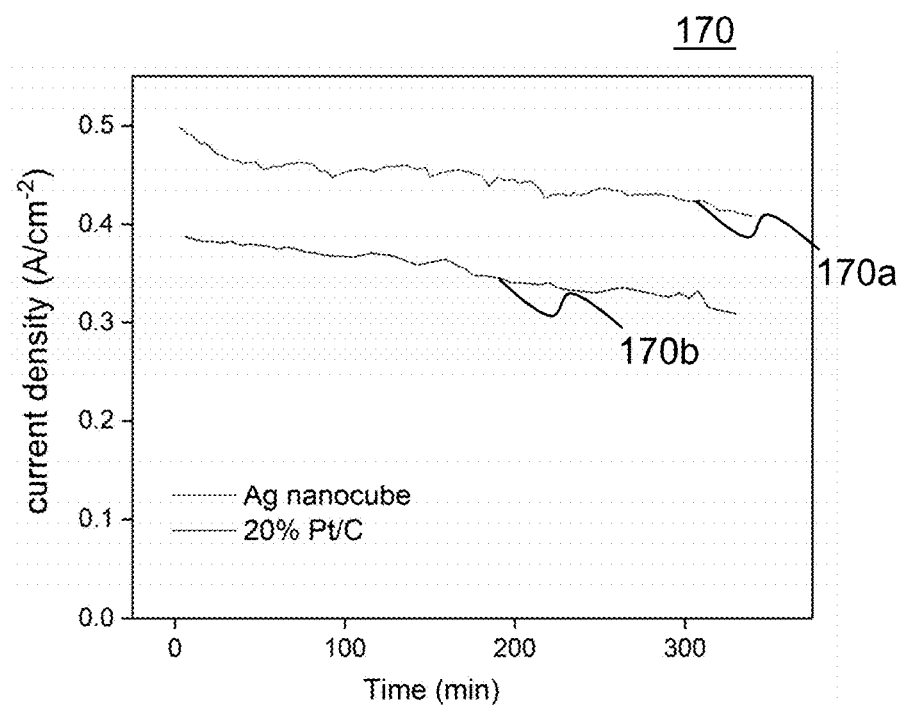
FIG. 17 is a graph showing stability testing for the silver nanocubes catalysts of the invention in comparison to the 20% Pt/C catalyst of the prior art.

Referring now to FIG. 17, there is shown a graph 170 showing stability testing for the silver nanocubes catalysts of the invention in comparison to the 20% Pt/C catalyst of the prior art. The graph 170 shows a time-dependent current density curve for silver nanocubes 170a and 20% Pt/C 170b at 2.5V under the reaction condition of 80° C. for 330 min. The graph shows that across the entire length of the experiment the nanocubes had a higher current density.

Figure 18:
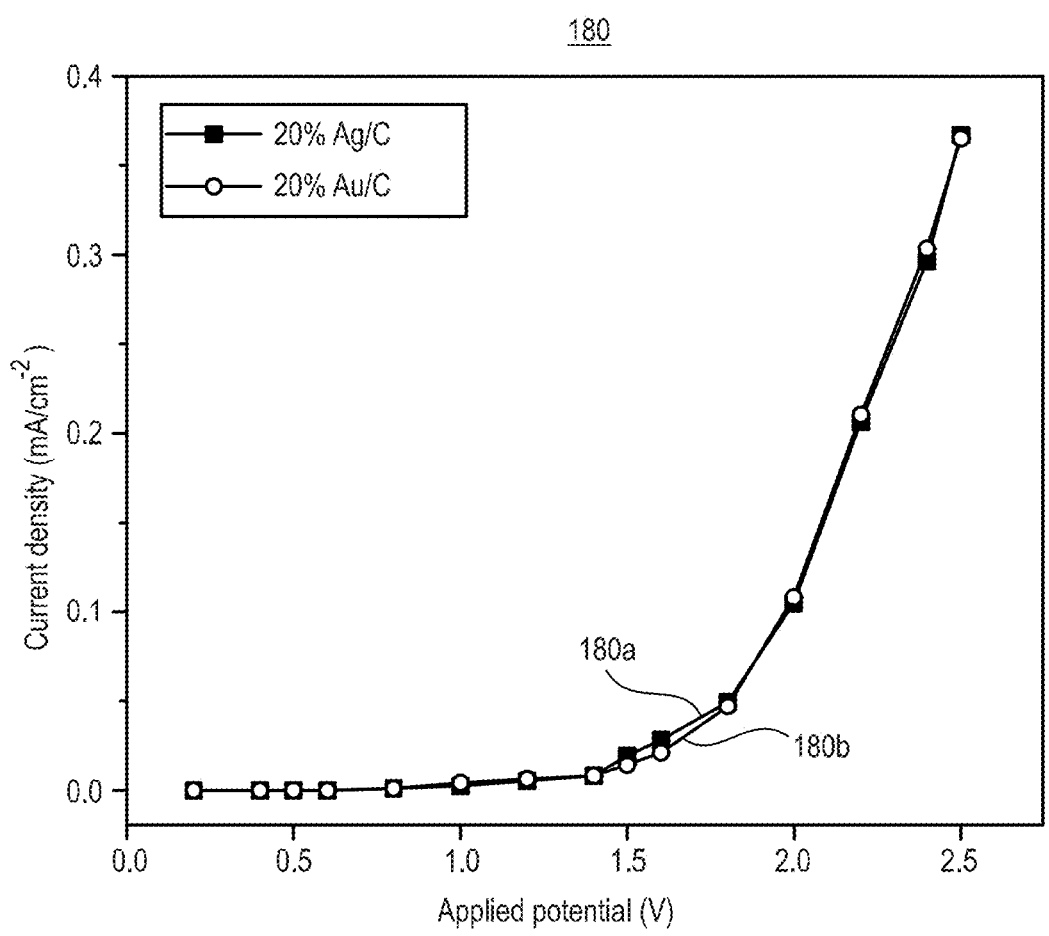
FIG. 18 is a graph showing the current-voltage curves measured for electrolysis cells containing a silver nanosphere-based electrode and a gold nanosphere-based electrode 180b.

Referring now to FIG. 18, there is shown a graph 180 showing current-voltage curves measured for electrolysis cells containing a silver nanosphere-based electrode 180a, and a gold nanosphere-based electrode 180b. The gold nanoparticles were formed by reduction of $HAuCl_4$ (5% $H_2/N_2$ at 250° C. for 3 hours). Both of the gold and silver cathodes were formed as previously discussed. The current-voltage curves 180a, 180b show that the activity is comparable for silver nanosphere-based and gold nanosphere-based electrodes and that above 1.75V there is a significant increase in current density.

Example 7

Preparation and Texting of Electrodes Containing Ag-Shell Au-Core Nanoparticles a. Preparation of the Ag-Shell Au-Core Nanoparticles The following Ag-shell Au-core nanoparticles were prepared according to the method described by Samal, A. K et al. (Size Tunable Au@Ag Core-Shell Nanoparticles: Synthesis and Surface-Enhanced Raman Scattering Properties. Langmuir 2013, 29 (48), 15076-15082). The nanoparticles were quasi-spherical nanoparticles each having a different Ag shell thickness and Au core diameter:
 i. Ag shell thickness: 9.5 nm and Au diameter: 25.7 nm;
 ii. Ag shell thickness: 3.6 nm and Au diameter: 25.7 nm;
 iii. Ag shell thickness: 0.8 nm (nearly one monolayer) and Au diameter: 25.7 nm;
 iv. Pure Au core with diameter: 25.7 nm.

b. Characterisation of the Ag-Shell Au-Core Nanoparticles

Figure 19A:
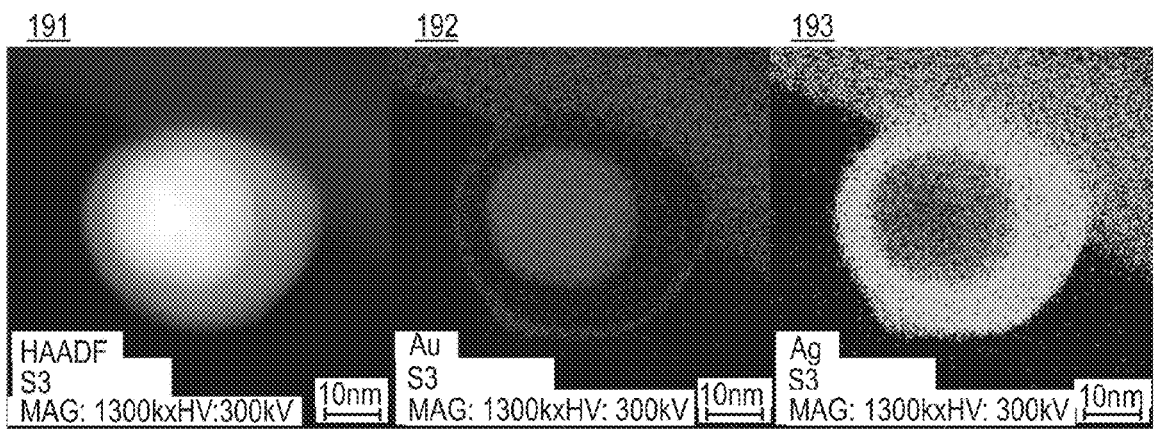
FIGS. 19A to 19D are STEM (HAADF) images of nanoparticles for use on electrodes according to Examples 7i. to 7iv. of the invention.

Referring now to FIG. 19A, there is shown a scanning transmission electron microscope (STEM) image using high-angle annular dark-field imaging (HAADF) of the nanoparticles according to (i) showing the Ag-shell and the Au-core (image 191). There is also shown an EDX (Energy-dispersive X-ray) spectrum for the Au (image 192) and the Ag (image 193) of the nanoparticles of (i).

Figure 19B:
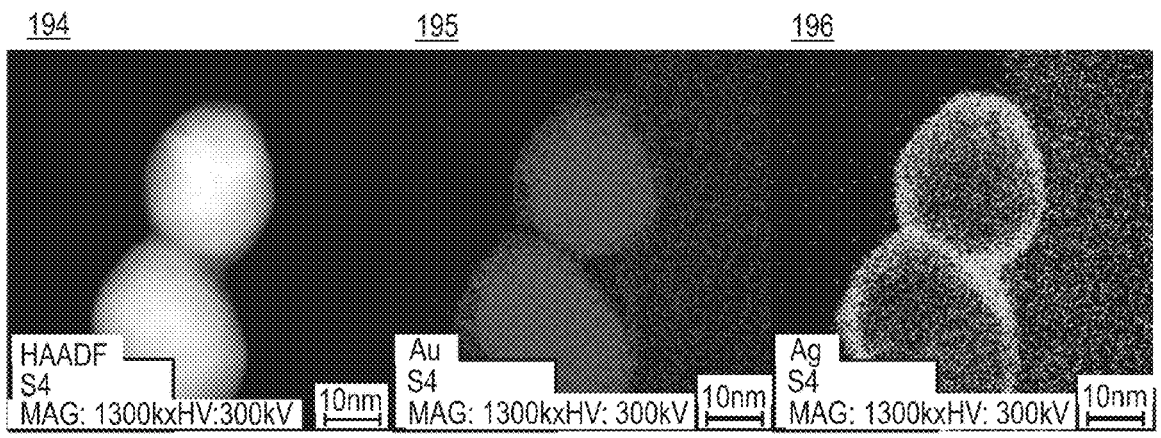

Referring now to FIG. 19B, there is shown a scanning transmission electron microscope (STEM) image using high-angle annular dark-field imaging (HAADF) of the nanoparticles according to (ii) showing the Ag-shell and the Au-core (image 194). There is also shown an EDX (Energy-dispersive X-ray) spectrum for the Au (image 195) and the Ag (image 196) of the nanoparticles of (ii).

Figure 19C:
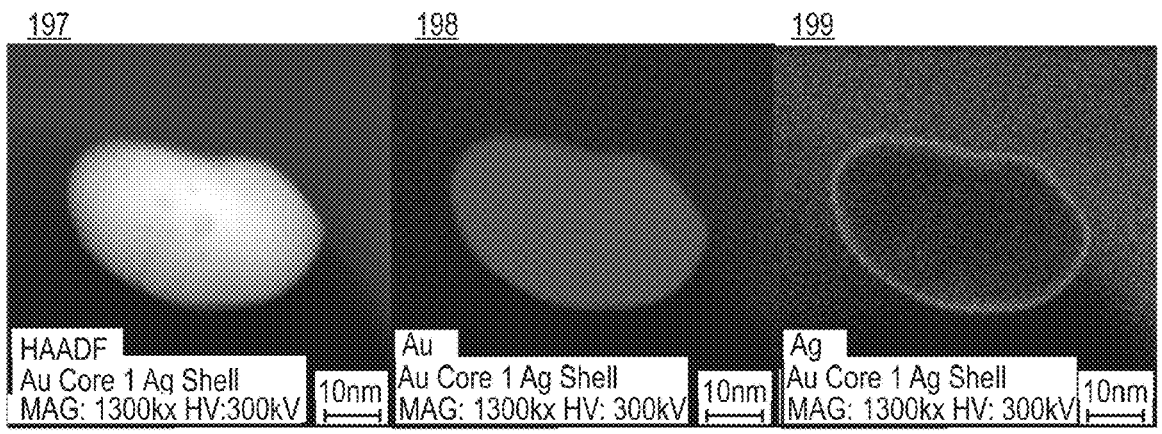

Referring now to FIG. 19C, there is shown a scanning transmission electron microscope (STEM) image using high-angle annular dark-field imaging (HAADF) of the nanoparticles according to (iii) showing the Ag-shell and the Au-core (image 197). There is also shown an EDX (Energy-dispersive X-ray) spectrum for the Au (image 198) and the Ag (image 199) of the nanoparticles of (iii).

Figure 19D:
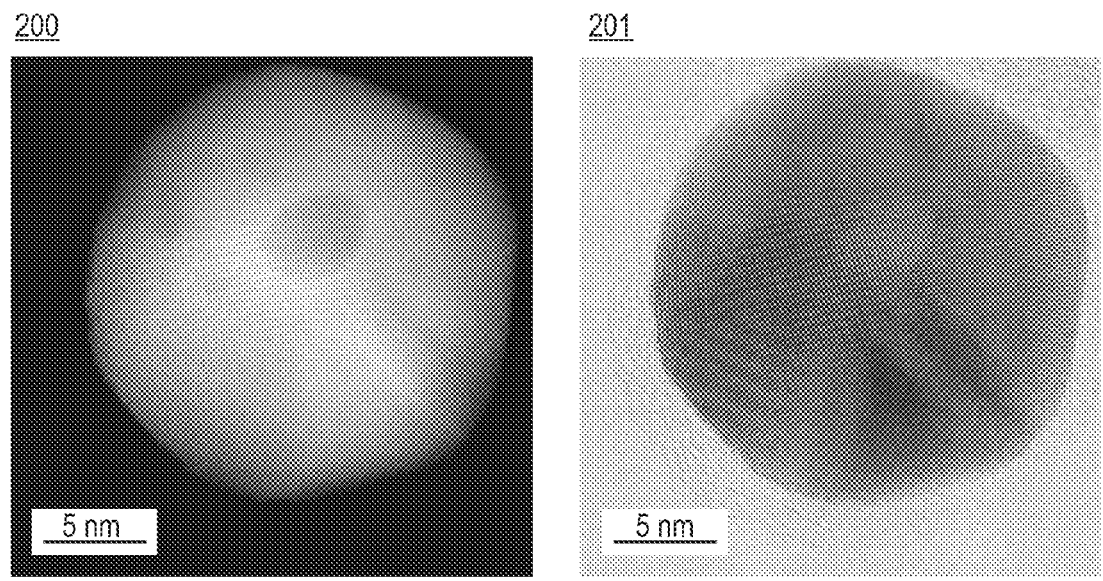
Figure 20A:
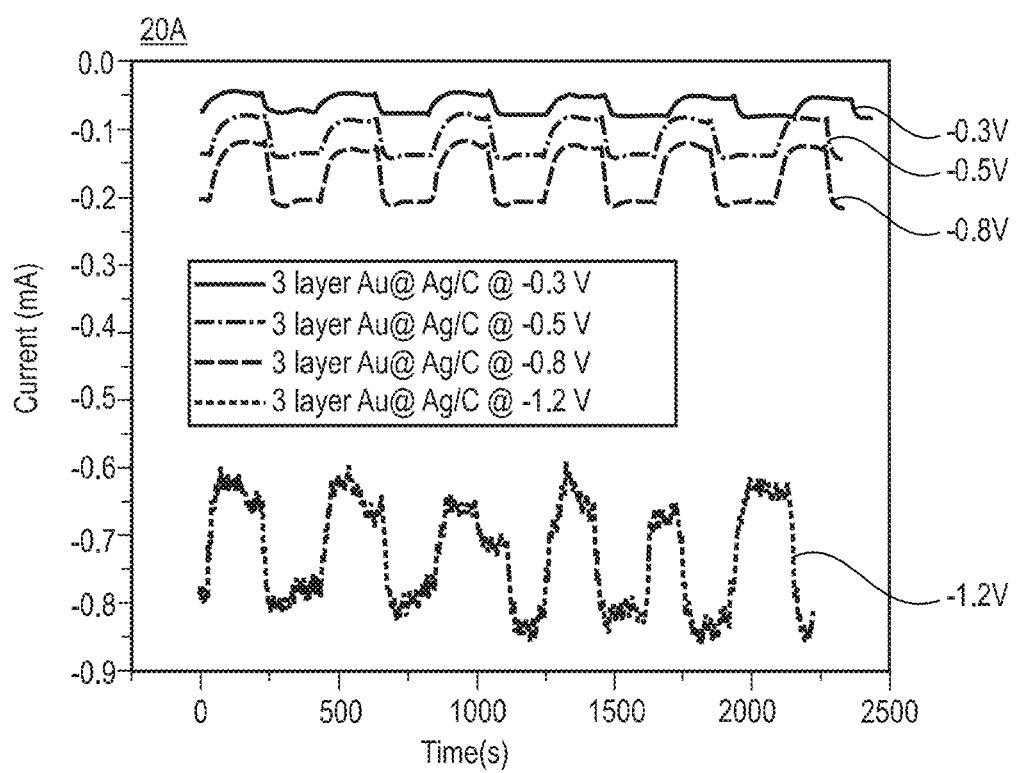
FIGS. 20A to 20D are current vs. time plots for electrodes according to Examples 7i. to 7iv. of the invention.
Figure 20B:
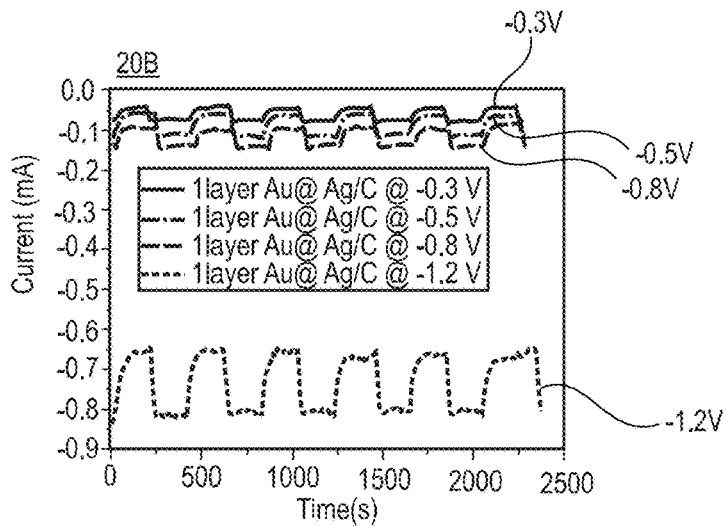
Figure 20C:
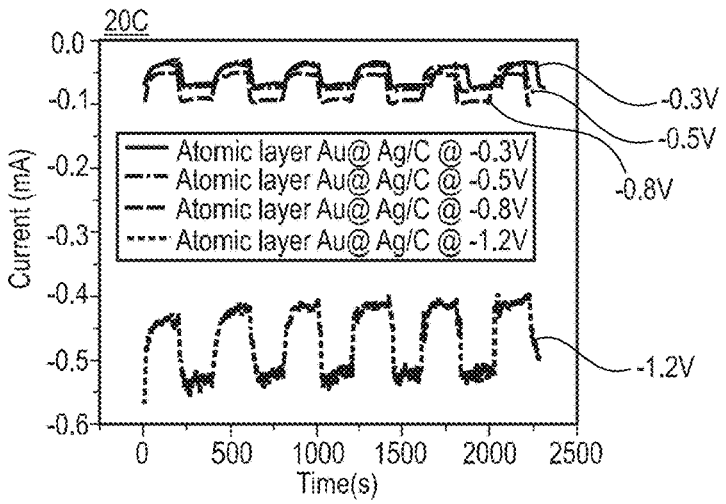
Figure 20D:
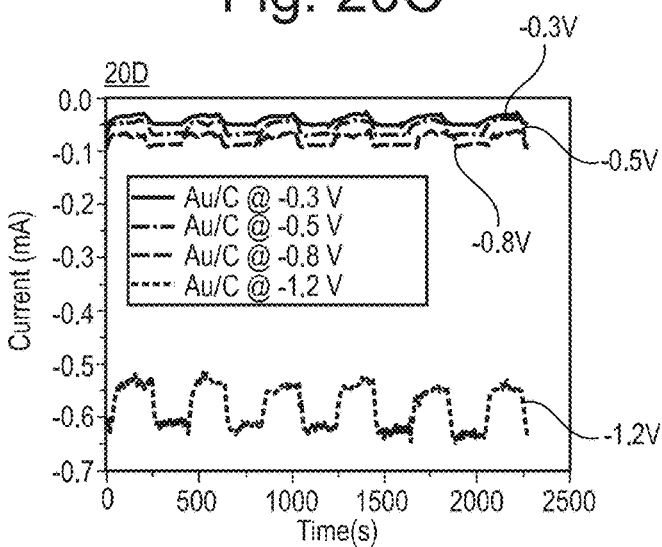

Referring now to FIG. 19D, there is shown a first and second scanning transmission electron microscope (STEM) image using high-angle annular dark-field imaging (HAADF) of the nanoparticles according to (iv) (image 200 and 201).

c. Fabrication of Electrodes Containing the Ag-Shell Au-Core Nanoparticles

Electrodes according to Examples 7i. to 7iv. were prepared accordingly:
 Eample 7i: 20 wt. % of nanoparticles (i) (ag shell thickness: 9.5 nm and au diameter: 25.7 nm) was impregnated onto Vulcan® carbon (Vulcan XC® series from Cabot Corp) followed by deposition onto conductive fluorine doped tin oxide (FTO) glass to form the electrode.
 Example 7ii: 20 wt. % of nanoparticles (ii) (Ag shell thickness: 3.6 nm and Au diameter: 25.7 nm) was impregnated onto Vulcan carbon followed by deposition onto conductive FTO glass to form the electrode.
 Example 7iii: 20 wt. % of nanoparticles (ii) (Ag shell thickness: 0.8 nm (nearly one monolayer) and Au diameter: 25.7 nm) was impregnated onto Vulcan carbon followed by deposition onto conductive FTO glass to form the electrode.
 Example 7iv: 20 wt. % of nanoparticles (ii) (Pure Au core with diameter: 25.7 nm) was impregnated onto Vulcan carbon followed by deposition onto conductive FTO glass to form the electrode.

d. Testing the Electrodes According to Examples 7i to 7iv

Referring now to FIGS. 20A to 20D, there is shown a graph 20A to 20D corresponding to testing of the electrodes according to Examples 7i. to 7iv. of the invention respectively.

The graphs 20A to 20D show the current vs. time of each electrode according to Examples 7i. to 7iv. of the invention. Each electrode was tested at a constant polarization voltage at −0.3 V, −0.5V, −0.8V, and −1.2 V.

The current was measured with and without illumination of tungsten visible (UV-cut off) light to the material. It is shown that higher negative currents at the same potentials were observed due to the plasmonic promoting effect of the composite nanoparticle material.

The inventors believe that an electrolyser containing the electrodes of Examples 7i. to 7iv. is expected to operate at the same potentials but with higher currents generated (hence higher $H_2$ production activities) under the visible light illumination.

Referring now to Table 2 below, there is shown the electrochemical enhancements in current (corresponding to $H_2$ production activity) at constant polarization voltage for the electrodes according to Examples 7i. to 7iv. The positive enhancement in the current density measured under visible light illumination is in comparison to the dark condition.

TABLE 2

Enhancement in current for visible light illumination vs. dark conditions

| Voltage | Enhancement for Electrode 7i. | Enhancement for Electrode 7ii. | Enhancement for Electrode 7iii. | Enhancement for Electrode 7iv. |
|---|---|---|---|---|
| −0.3 V | 50.0% | 68.5% | 73.5% | 48.2% |
| −0.5 V | 60.5% | 81.5% | 106.7% | 56.4% |
| −0.8 V | 47.6% | 48.1% | 73.1% | 28.6% |
| −1.2 V | 21.3% | 24.5% | 27.5% | 14.8% |

It has been surprisingly found that the electrochemical $H_2$ production may be enhanced by using a visible light source to illuminate the electrode, in use. The enhancement is most significant at −0.5V.

In summary, it has been surprisingly found that metals, e.g. Group 11 metals, specifically silver nanoparticles consisting of different morphologies (i.e. nanocubes, nanowires, and nanospheres) may be used as catalysts (e.g. electrocatalysts on electrodes) in a PEM water electrolyser to generate hydrogen. This is advantageous because Group 11 metals, e.g. silver, are more abundant and less expensive than noble earth metals, e.g. platinum, that have been traditionally used in PEM electrolysers for generating hydrogen.

The current density for Examples using the PEM water electrolysis apparatus at low applied potential followed the trend: silver nanocubes<silver nanowires<silver nanosphere<20% Pt/C. Surprisingly, this trend is totally reversed at high (greater than 1.75 V, e.g. greater than 2.0 V) applied potential. It has been surprisingly found that electrodes comprising the silver nanocubes show higher hydrogen production rates (higher current densities) than the standard 20% Pt/C under the practical potential regime of 2.0 to 2.5V. In addition, the same trends are observed when 20% silver nanoparticles of different morphologies are supported on carbon as that of Pt/C.

It is thought that this apparent switch in trend at high potential (2.0 to 2.5 V) is a result of a change in rate determining step for hydrogen production on surface, from Volmer (where the formation of surface adsorbed hydrogen atoms from protons is limiting) to Tafel (where recombination of adsorbed hydrogen atoms and desorption of dihydrogen is limiting). This theory is supported by linear sweep voltammetry (LSV) measurements and density functional theory (DFT) calculations (shown in FIGS. 13, 14, 16A and 16B).

As shown in FIGS. 11 and 12, the current density measurements recorded for silver nanoparticle-based electrodes according to the invention were lower than the current density measurements recorded for the electrochemical cells comprising a cathode of the prior art (comprising 20% Pt/C) at low potentials (lower than 1.75V). The current density measurements recorded for silver nanoparticle-based electrodes increased at high potential (above 1.75V, e.g. at 2.0V). Surprisingly, the current density measurements recorded for silver nanoparticle-based electrodes were higher than for current density measurements recorded for electrodes of the prior art (comprising 20% Pt/C) at high potential (e.g. at 2.5V).

Although a high voltage is required for high current density measurements (which is equivalent to hydrogen production) using silver nanoparticles catalysts, the electrodes of the invention remain advantageous over the prior art because the higher cost in electricity to achieve a higher potential is offset by the lower cost of the silver nanoparticles, in contrast to the electrocatalysts, e.g. platinum, of the prior art. Therefore, the overall process may still be cheaper to generate hydrogen using the electrodes of the invention in contrast to the prior art even though a higher potential is required.

It will be appreciated by those skilled in the art that several variations to the aforementioned embodiments are envisaged without departing from the scope of the invention.

It will also be appreciated by those skilled in the art that any number of combinations of the aforementioned features and/or those shown in the appended drawings provide clear advantages over the prior art and are therefore within the scope of the invention described herein.

The invention claimed is:

1. An electrolyser for generating hydrogen from water, the electrolyser comprising an electrode, the electrode comprising nanoparticles comprising Group 11 elements, or alloys of Group 11 elements, or composites or mixtures of Group 11 elements, wherein the nanoparticles comprise nanocubes and wherein at least the surface of the nanocubes comprise silver (Ag), further comprising a power supply arranged to supply a voltage and a counter electrode, the electrode and the counter electrode connected or connectable to the power supply, and wherein the electrolyser, upon connection to the power supply, is configured to generate hydrogen from water.

2. An electrolyser according to claim 1, wherein the electrode is a cathode.

3. An electrolyser according to claim 1, further comprising a proton exchange membrane (PEM).

4. An electrolyser according to claim 3, wherein the PEM comprises an acidic polymer.

5. An electrolyser according to claim 4, wherein the PEM comprises a sulfonated fluorinated hydrocarbon selected from sulfonated tetrafluoroethylene or a sulphonated polysulphone (SPSF).

6. An electrolyser according to claim 1, wherein the counter electrode is an anode comprising iridium dioxide ($IrO_2$).

7. An electrolyser according to claim 1, wherein the nanoparticles further comprise nanospheres.

8. An electrolyser according to claim 1, wherein the nanoparticles are composed of silver (Ag) or alloys or mixtures of silver with one or more of copper (Cu), or gold (Au).

9. An electrolyser according to claim 7, wherein the nanospheres comprise a shell-core composite structure.

10. An electrolyser according to claim 9, wherein the nanospheres comprise an Ag-shell and a core composite structure.

11. An electrolyser according to claim 1, wherein the nanoparticles comprise a morphology dominated by {100} facets.

12. An electrolyser according to claim 1, further comprising a light source suitable for illuminating the electrode.

13. An electrolyser according to claim 1, further comprising an acidic electrolyte.

* * * * *